(12) United States Patent
Nadimpalli et al.

(10) Patent No.: US 10,909,980 B2
(45) Date of Patent: Feb. 2, 2021

(54) MACHINE-LEARNING DIGITAL ASSISTANTS

(71) Applicant: SKAEL, Inc., San Francisco, CA (US)

(72) Inventors: Baba Nadimpalli, San Francisco, CA (US); Farooq Khalid, San Ramon, CA (US); Ritesh Nadhani, Santa Clara, CA (US)

(73) Assignee: SKAEL, Inc., San Francisco, CA (US)

( * ) Notice: Subject to any disclaimer, the term of this patent is extended or adjusted under 35 U.S.C. 154(b) by 5 days.

(21) Appl. No.: 15/907,195

(22) Filed: Feb. 27, 2018

(65) Prior Publication Data

US 2018/0247648 A1     Aug. 30, 2018

Related U.S. Application Data

(60) Provisional application No. 62/464,356, filed on Feb. 27, 2017.

(51) Int. Cl.

| *G10L 15/22* | (2006.01) |
|---|---|
| *G06F 9/451* | (2018.01) |
| *G06N 5/04* | (2006.01) |
| *G10L 15/26* | (2006.01) |
| *G06N 20/00* | (2019.01) |
| *G06F 16/332* | (2019.01) |

(Continued)

(52) U.S. Cl.
CPC .............. *G10L 15/22* (2013.01); *G06F 9/453* (2018.02); *G06F 15/76* (2013.01); *G06F 16/3329* (2019.01); *G06N 5/04* (2013.01); *G06N 20/00* (2019.01); *G10L 15/26* (2013.01); *G06F 8/33* (2013.01); *G06N 5/046* (2013.01); *G10L 2015/223* (2013.01); *G10L 2015/228* (2013.01)

(58) Field of Classification Search
CPC ....... G10L 15/22; G10L 15/26; G10L 15/193; G06F 9/453; G06F 16/3329; G06F 3/167; G06N 20/00; G06N 5/04; G06N 5/02
See application file for complete search history.

(56) References Cited

U.S. PATENT DOCUMENTS

| 5,774,860 A * | 6/1998 | Bayya ..................... G10L 15/22 |
|---|---|---|
| | | 700/246 |
| 9,495,962 B2 * | 11/2016 | Govrin ................... G06Q 40/02 |

(Continued)

*Primary Examiner* — Mohammad K Islam
(74) *Attorney, Agent, or Firm* — Schwegman Lundberg & Woessner, P.A.

(57) ABSTRACT

A method of improving response times associated with responding to requests submitted at one or more front-end systems is disclosed. An utterance is listened for at an intelligent virtual assistant included in the one or more front-end systems. At least one of an intent, a context, and a classification is inferred from the utterance. One or more back-end system commands are generated based on the inferring. The one or more back-end system commands are selected based on machine-learned mappings of the at least one of the intent, the context, and the classification to machine-learned organization-specific pathways into the one or more back-end systems. The one or more back-end system commands are distributed across the one or more back-end systems. A response to the utterance is communicated for presentation via the intelligent virtual assistant, the response including an aggregation of the one or more results received.

20 Claims, 16 Drawing Sheets
(12 of 16 Drawing Sheet(s) Filed in Color)

(51) Int. Cl.
*G06F 15/76* (2006.01)
*G06F 8/33* (2018.01)

(56) References Cited

U.S. PATENT DOCUMENTS

| | | | | |
|---|---|---|---|---|
| 9,922,642 B2* | 3/2018 | Pitschel | ................ | G10L 15/063 |
| 10,199,051 B2* | 2/2019 | Binder | ................... | G06F 3/167 |
| 10,276,170 B2* | 4/2019 | Gruber | ................... | G10L 17/22 |
| 2014/0040748 A1* | 2/2014 | Lemay | ................... | G06F 3/167 |
| | | | | 715/728 |
| 2014/0222436 A1* | 8/2014 | Binder | ................... | G06F 3/167 |
| | | | | 704/275 |
| 2014/0365209 A1* | 12/2014 | Evermann | ............ | G06F 17/279 |
| | | | | 704/9 |
| 2014/0365227 A1* | 12/2014 | Cash | ...................... | G10L 15/22 |
| | | | | 704/275 |
| 2014/0365885 A1* | 12/2014 | Carson | ................... | G06F 3/167 |
| | | | | 715/708 |
| 2015/0066479 A1* | 3/2015 | Pasupalak | .............. | G06F 17/27 |
| | | | | 704/9 |
| 2015/0193379 A1* | 7/2015 | Mehta | .................. | G10L 15/00 |
| | | | | 704/9 |
| 2016/0110071 A1* | 4/2016 | Brown | ................... | G06F 3/165 |
| | | | | 715/758 |
| 2016/0253434 A1* | 9/2016 | Yu | ...................... | G06F 17/2785 |
| | | | | 707/760 |
| 2017/0162197 A1* | 6/2017 | Cohen | .................... | G10L 25/63 |
| 2018/0068031 A1* | 3/2018 | Hewavitharana | ... | G06F 16/9535 |
| 2018/0143967 A1* | 5/2018 | Anbazhagan | ............. | G06F 8/30 |
| 2018/0144046 A1* | 5/2018 | Braga | ................ | G06F 16/3329 |
| 2018/0165596 A1* | 6/2018 | Abrams | ................... | G06N 20/00 |
| 2018/0190272 A1* | 7/2018 | Georges | ................. | G10L 15/22 |
| 2018/0196683 A1* | 7/2018 | Radebaugh | .......... | G06F 16/951 |
| 2018/0261203 A1* | 9/2018 | Zoller | .................. | G10L 13/027 |
| 2018/0314689 A1* | 11/2018 | Wang | ................. | G06F 17/2785 |
| 2019/0027147 A1* | 1/2019 | Diamant | ................ | G06F 16/58 |
| 2019/0057693 A1* | 2/2019 | Fry | ....................... | G10L 15/22 |
| 2019/0065498 A1* | 2/2019 | Yuan | ...................... | G06N 5/027 |
| 2019/0065556 A1* | 2/2019 | Kumar | .................... | G06F 9/451 |
| 2019/0130286 A1* | 5/2019 | Salameh | ................ | G06N 5/022 |
| 2019/0156222 A1* | 5/2019 | Emma | .................. | G10L 15/22 |
| 2019/0236464 A1* | 8/2019 | Feinson | ................ | G06F 17/27 |
| 2019/0237068 A1* | 8/2019 | Canim | ................. | G06F 16/219 |
| 2019/0279627 A1* | 9/2019 | Wang | ................... | G10L 15/22 |
| 2019/0279633 A1* | 9/2019 | Venkata | ................ | G06F 3/167 |

* cited by examiner

MACHINE-LEARNING DIGITAL ASSISTANTS

CROSS-REFERENCE TO RELATED APPLICATIONS

This application claims the benefit of U.S. Provisional Application No. 62/464,356, filed Feb. 27, 2017, which is incorporated by reference herein in its entirety.

TECHNICAL FIELD

The present application relates generally to the technical field of machine-learning digital assistants, and, in one specific example, to methods, systems, and computer-readable mediums having instructions for implementing machine-learning digital assistants for advanced analytics, procurement, and operations tasks.

BACKGROUND

Despite a plethora of technological platforms, technologies, and tools designed to enhance efficiencies and improve automation of business organizations and other organizations with respect to their operations, including internal, business-to-business (B2B), and business-to-customer (B2C) operations, such as ticketing, purchasing, asset management operations, a high percentage of these operations are still conducted via traditional, low-tech, and less efficient means, including through people pyramids of person-to-person communications (e.g., via telephone, e-mails, faxes, and so on). It is likely that factors associated with overhead, complexity, and/or variety of the available technologies, tools, and platforms have prevented these platforms from becoming more widely adopted. Thus, improvements or additions to these platforms, technologies, and tools that work toward solving ease-of-use problems will likely lead to higher adoption rates within organizations, thus improving efficiencies of these organizations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are illustrated by way of example and not limitation in the figures of the accompanying drawings.

DETAILED DESCRIPTION

Figure 1:
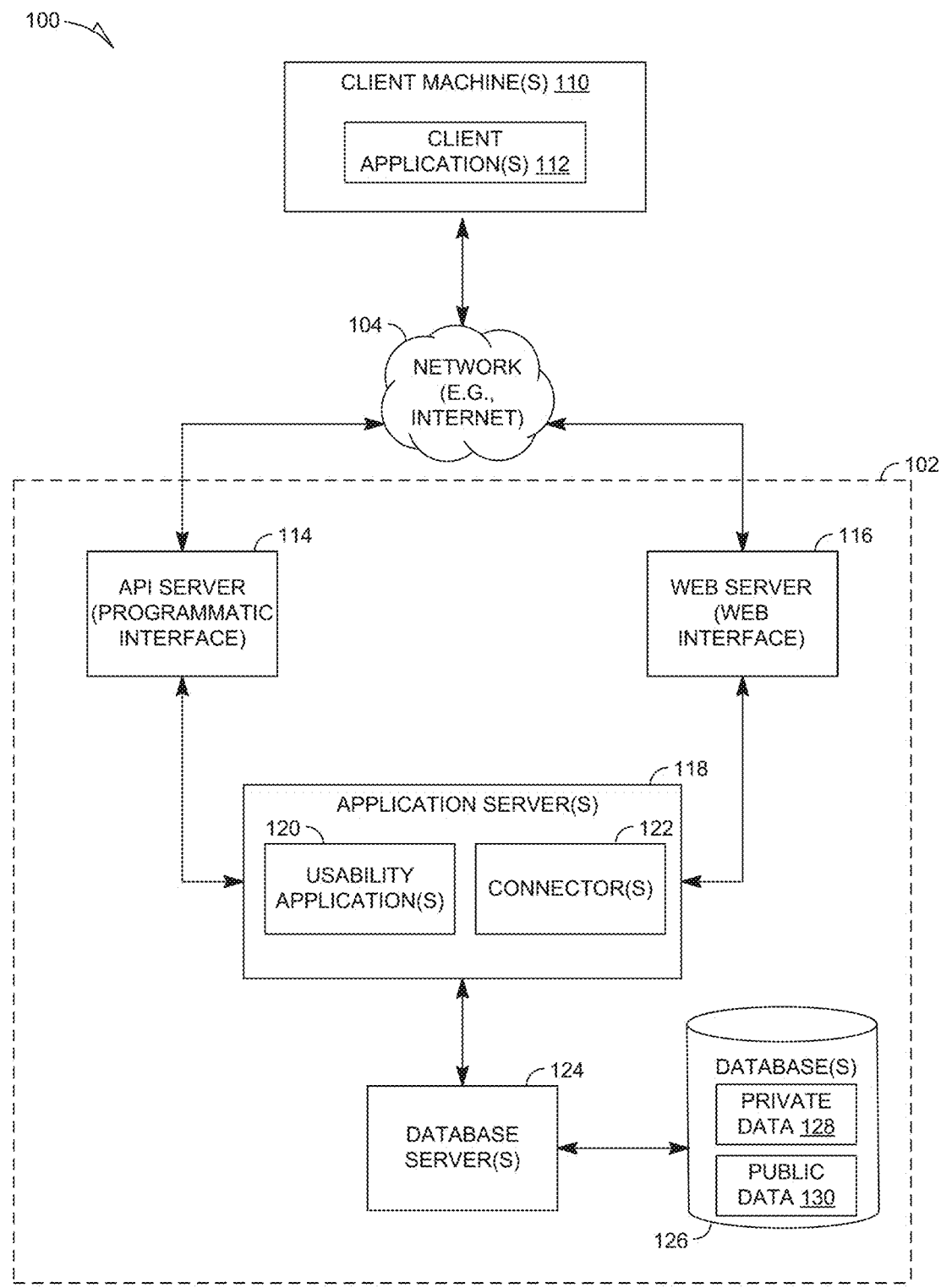
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

A digital assistant, also referred to as a virtual assistant or chatbot, is a software agent that is configurable to perform tasks for a user. Examples of digital assistants include Apple Siri, Google Assistant, Amazon Alexa, and Microsoft Cortana. Digital assistants typically interact with users via one or more of text (e.g., online chat, such an instant message application), voice, image, or video inputs or outputs. Digital assistants use natural language processing (NLP) to match user inputs to user intents. Many digital assistants use artificial intelligence techniques, including machine learning, to improve their matching performance. Digital assistants are typically activated using a wake word (e.g., "Alexa" for Amazon Alexa or "OK Google" for Google Assistant).

Organizations may employ or support any number of a broad range of back-end systems to assist in management of their operations. Such systems may include one or more analytics systems (e.g., Splunk or Tableau systems), data or database systems (e.g., Hadoop, MongoDB, or MySQL systems), procurement, sourcing, ERP, spend, supplies, and logistics systems (e.g., Coupa, SAP, Ariba, Oracle, Opera, iValua, or Workday systems), operations systems (e.g., Spiceworks, Solarwinds Orion, HP OpenView/Helion Suit, IBM Cloud Orchestrator, or OEM 13c systems), public cloud systems (e.g., AWS, Azure, Google, Oracle, or SFDC systems), cloud services (e.g., Ravello), cloud access security broker (CASB) systems (e.g., SkyHigh Networks, Netskope, Elastica (Symantec/BlueCoat), or CloudLock (Cisco) systems), document editing and signing systems (e.g., Office 365, Google Docs, Adobe Sign, or Docusign systems), storage systems (e.g., Box, DropBox, OneDrive, Google Drive, Sharepoint, or iCloud systems), helpdesk integration systems (e.g., ZenDesk, ServiceNow, JIRA, or other XML/API systems), audio/video systems (e.g., Twilio, H.323, or SIP Integration systems), product pricing systems (e.g., Tech Data/Avnet, Arrow, Westcon, or Ingram systems), service pricing systems (e.g., system integrator systems (e.g., Dimension Data, Presidio, WWT, ePlus, NTT Data, Wipro, or Infosys systems), service provider systems (e.g., XO, AT&T, Verizon, Tata Communications, CenturyLink, or Zayo systems), freelance systems (e.g., Upwork, Adecco, eLance systems), or financing systems (e.g., XfinAM or Capital Pines systems), co-location systems (e.g., Equinix, DRT, RagingWire, CenturyLink/Level3, BT, AT&T, or SingTel systems)).

Organizations may also employ or support any number of a broad range of operating systems or platforms, including web platforms (e.g., Chrome, Firefox, Opera, Microsoft Edge, or Microsoft Internet Explorer), desktop application platforms (e.g., Mac or Windows), tablet or mobile platforms (e.g., Web, iOS, Android), low-tech platforms (e.g., email, instant messaging, Slack, or Microsoft Teams), or augmented reality platforms (e.g., Microsoft Hololens).

In example embodiments, one or more automation modules are disclosed that are configured connect one or more front-end systems, such as one or more digital assistants, to one or more back-end systems that are deployed in a organizational environment, such as any of the back-end systems listed above. In example embodiments, the one or more automation modules include a listening module that is configured to infer at least one of an intent, context, or classification from an utterance received at the one or more front-end systems, a learning module that is configured to generate one or more requests (e.g., distribute one or more commands to the one or more back-end systems), receive one or more responses to the one or more requests, format the responses according to one or more machine-learned presentation rules, and generate insights for use in future command processing (e.g., across multiple instances of the one or more automation modules deployed across multiple organizations), and a looking module that is configured to generate the one or more responses to the one or more requests (e.g., by executing the one or more commands, such as commands for querying or scraping data sources associated with the back-end system and/or data sources external to the one or more back-end systems, such as external public data sources). In example embodiments, the insights are data structures containing data gathered via one or more of the usability modules from a single organization or from multiple instances of the one or more usability modules deployed across multiple organizations, or a combination of both. The insights may be correlated with data structures pertaining to attributes associated with each corporation from which the data is gathered. The insights may be stripped of identifying data (e.g., to protect privacy individual organizations). The insights may be provided for querying via a database system or one or more backend systems to aid an organization in identifying machine-learned correlations across multiple data sets that may be particularly relevant to the organization.

In example embodiments, each of multiple instances of learning modules deployed across multiple organizational environments employ machine-learning techniques to learn business workflows associated with each organizational environment, including business-specific vocabularies that are used for purposes of determining intent, context, and classification of utterances received from the front-end systems within each organizational environment, and mapping of utterances received from the one or more front-end systems to the machine-learned business workflows.

In example embodiments, machine-learned pathways into the one or more back-end systems, including combinations of commands that are associated with particular utterances within particular organizational environments are stored as insights that are anonymized and made accessible (e.g., via a subscription cloud service) to other instances of the one or more automation modules deployed in other organizational environments. Thus, for example, an organization having particular attributes (e.g., being in a particular industry, having a particular size range, generating a particular range of revenues, having a particular combination of back-end systems deployed, and so on) may access one or more insights derived from an aggregation of data pertaining to multiple organizations having similar attributes (e.g., to improve mappings of utterances received at the front-end systems to functionality provided by the back-end systems deployed within the organization).

In example embodiments, a method of improving response times associated with responding to requests submitted at one or more front-end systems is disclosed. An utterance is listened for at an intelligent virtual assistant included in the one or more front-end systems. At least one of an intent, a context, and a classification is inferred from the utterance. One or more back-end system commands are generated based on the inferring. The one or more back-end system commands are selected based on machine-learned mappings of the at least one of the intent, the context, and the classification to machine-learned organization-specific pathways into the one or more back-end systems. The one or more back-end system commands are distributed across the one or more back-end systems. A response to the utterance is communicated for presentation via the intelligent virtual assistant, the response including an aggregation of the one or more results received. In example embodiments, one or more operations of this method or other methods disclosed herein may be embodied as a set of instructions stored in one or more computer memories. The set of instructions may configure one or more computer processors (e.g., of front-end systems and/or back-end systems in an organizational environment) to perform the operations.

FIG. 1 is a network diagram depicting a system 100 within which various example embodiments may be deployed. A networked system 102, in the example form of a cloud-based or other networked system, provides server-side functionality, via a network 104 (e.g., Local Area Network (LAN), the Internet or Wide Area Network (WAN)) to one or more clients machines 110. FIG. 1 illustrates client application(s) 112 on the client machines 110. Examples of client application(s) 112 may include one or more digital assistants, as described below. Each of the client application (s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more usability application(s) 120 and connector(s) 122. The usability application(s) 120 are configured to connect the front-end systems to the back-end systems of an organization so as to improve the usability of the back-end systems by users of the front-end systems, as explained herein. The connector(s) 122 include API keys (e.g., XML, JSON, or plain text token keys) for accessing appropriate back-end systems deployed within an organizational environment, including enterprise application connectors. The application servers 118 are, in turn, shown to be coupled to one or more database servers 124 that facilitate access to one or more databases 126 or data stores, such as SQL data stores, including PostgreSQL relational databases, NoSQL data stores, or non-relational data stores.

While the usability applications 120 and connectors 122 are shown in FIG. 1 to form part of the networked system 102, in alternative embodiments, the applications 120 and connectors 122 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various usability applications 120 and connectors 122 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various usability applications 120 via the web interface supported by the web server 116. Similarly, native applications executing on the client machine(s) 110 may access the various services and functions provided by the usability applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The usability applications 120 and connectors 122 may be hosted on dedicated or shared server machines (not shown) that are communicatively coupled to enable communications between server machines. The usability applications 120 and 122 themselves are communicatively coupled (e.g., via appropriate interfaces) to each other and to various data sources, so as to allow information to be passed between the usability applications 120 and connectors 122 and so as to allow the usability applications 120 and connectors 122 to share and access common data. The usability applications 120 and connectors 122 may furthermore access one or more databases 126 via the database servers 124. In example embodiments, private data 128 is scraped from private data sources and public data 130 is scraped from public data sources stored in the databases 126, as explained in more detail below. Additionally, the one or more databases 126 may be specially configured to perform NLP processing of queries based on artificial intelligence (AI) and NLP models that are stored in the database and used during execution of one or more of the methodologies described herein. The one or more database 126 may further be configured to store data structures corresponding to machine-learned workflows, mappings of machine-learned workflows to one or more of intents, contexts, or classifications inferred from NLP input into digital assistants executing on one or more front-end systems, and other data structures disclosed herein.

Figure 2:
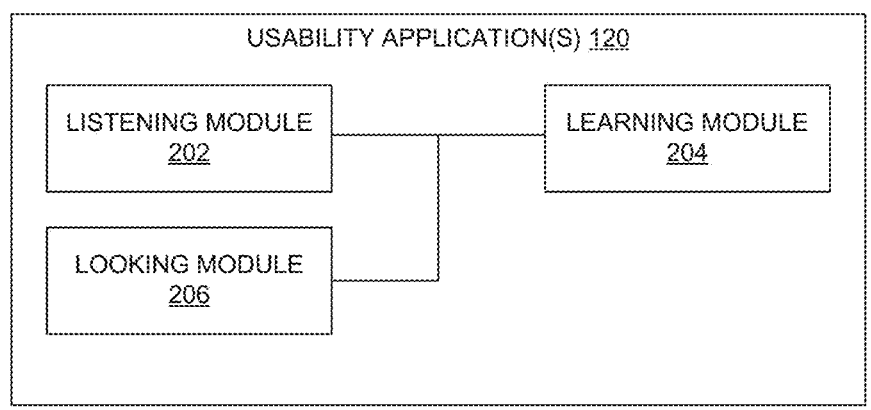
FIG. 2 is a block diagram illustrating example modules of the usability applications of FIG. 1.

FIG. 2 is a block diagram illustrating example modules of the usability application(s) 122. In example embodiments, a listening module 202 is configured to infer at least one of an intent, context, or classification from an utterance received at the one or more front-end systems, as described in more detail below. A learning module 204 is configured to generate one or more requests (e.g., distribute one or more commands to the one or more back-end systems), receive one or more responses to the one or more requests, format the responses according to one or more machine-learned presentation rules, and generate insights for use in future command processing (e.g., across multiple instances of the one or more automation modules deployed across multiple organizations), as described in more detail below. A looking module 206 is configured to generate the one or more responses to the one or more requests (e.g., by executing one or more commands, such as commands for querying or scraping data sources associated with the back-end system and/or data sources external to the one or more back-end systems, such as external public data sources), as described in more detail below.

Figure 3:
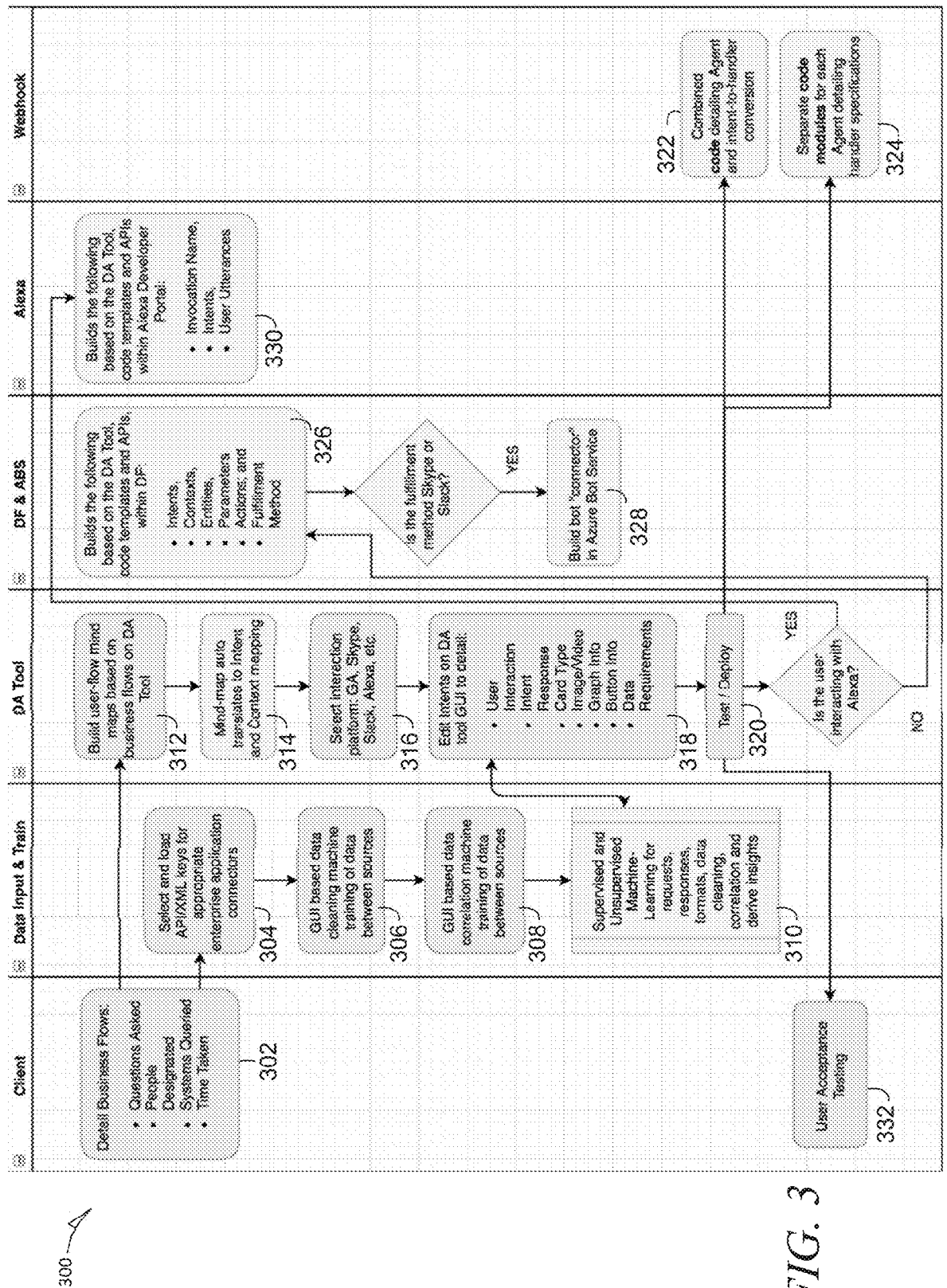
FIG. 3 is a flowchart illustrating example operations of a method of machine-learning of mappings of utterances received at the one or more front-end systems to functions provided by one or more back-end systems deployed in a organizational environment.

FIG. 3 is a flowchart illustrating example operations of a method 300 of machine-learning of mappings of utterances received at the one or more front-end systems to functions provided by one or more back-end systems deployed in a organizational environment. In example embodiments, the method 300 is performed by one or more of the modules of FIG. 2.

At operation 302, one or more client-side system(s) deployed in an organizational environment are monitored over a period of time to obtain training data for a generating a model of business workflows within the organization. For example, questions asked, queries entered, and other communications generated by client-side users are catalogued and stored (e.g., as an originating point or node) within a data structure representing business flows, workflows, or task flows within the organizational. The catalogued originating points or tasks may be linked to data structures representing people, roles, or additional tasks within the organization that are implicated by the originating tasks. Eventually, over time, a hierarchical map or tree-like data structure is generated that connects the originating points or nodes and the additional points or nodes implicated by each of the original points. As the points are interconnected within the organization, they eventually flow toward execution of one or more commands by back-end systems deployed within the organization, such as ticketing, asset management, human resource (e.g., employee on-boarding) management, or purchasing systems. The execution of the commands that are implicated by the originating points may be included as end points or nodes of the mapping data structure. Additionally, the flow of communication of responses from the end points through the various data points and back to the originating point is monitored and corresponding links or connections added or updated in the mapping data structure, defining a bidirectional flow. Performance metrics, such as the time it takes for a response to be received from a user after the user submits a request, are also tracked, including performance data pertaining to mid-points between the originating points and the end points. The tracking at the mid-points may include determining which of the tasks are performed by each person or role involved in the workflow and representing the associations between people, roles, and tasks as separate nodes within the workflow map in the associated data structures.

In example embodiments, additional machine-learning algorithms are generated for discovering or learning most, if not all, back-end functionality and data items available within the back-end systems deployed in an organizational environment (e.g., at end-point nodes), mapping the back-end functionality and data items to discovered or learned tasks performed at nodes between the originating and end-point nodes (e.g., at mid-point nodes) (or tasks that are anticipated to be performed based on insights learned or discovered with respect to those nodes, such as insights derived from data collected and stored at nodes executing other instances of the usability modules in other corporate environments, the insights being anonymized to protect the privacy of the organizations). Thus, between the machine-learning algorithms used to discover and learn pathways into the back-end systems (e.g., starting from the front-end systems and moving through the mid-point nodes to the back-end systems), additional machine-learning algorithms are used to discover and learn available pathways in the other direction, starting with the back-end systems and working backward through one or more workflows towards the front-end systems. An additional machine-learning algorithm may be trained to identify points of convergence between the machine-learning algorithms used for each workflow direction. Any combination of the machine-learning algorithms described herein may be combined and used to improve mappings or correlations between any combination of factors discussed herein, including between NLP communications (inputs and outputs), roles, tasks, functions, data, user interfaces, and so on, that are available with respect to the front-end and the back-end systems deployed in the organization. Thus, in example embodiments, a user of a digital assistant will not only have access via NLP to every function and data item available in the back-end systems, but also help in identifying the most relevant functions and data items for particular tasks that the user intends to perform, depending, for example, on various factors discussed herein, such as the attributes of the user and the position of the user within a workflow that is specific to the user and/or an organization of the user. In example embodiments, the user will also be proactively provided with help in identifying machine-learned NLP expressions that will allow the user to complete his intended tasks. Thus, the user need not have much familiarity, if any, with the actual commands that are ultimately issued to the back-end systems of an organization to satisfy the user's requests.

At operations 304-308, the workflow map data structure is used as a training data set for generation of one or more models of workflows that are specific to the environment of the organization in which the front-end systems and back-end systems are deployed. The models may include not only the learned workflows and pathways of particular organizations having particular attributes, but also a machine-learned vocabulary that corresponds to how NLP requests are formulated within the organization (e.g., at originating node, mid-point nodes, and end-nodes) and how they are mapped to the machine-learned workflows between front-end systems and back-end systems. In example embodiments, the organization-specific vocabulary may be stored as one or more insights that are anonymously accessible to other instances of the usability applications 122 that have been deployed within other organizational environments. Thus, the machine-learning disclosed herein may occur across multiple separate organizations, allowing one organization to leverage what has been learned by other organizations (e.g., with respect to vocabulary that is used to invoke particular connections or pathways from front-end systems and back-end systems and other machine-learned aspects disclosed herein), such as other organizations having similar properties or attributes.

At operation 304, keys (e.g., API/XML keys) for appropriate back-end systems deployed within an environment of the organization, including enterprise application connectors, are selected and loaded (e.g., from connectors 122).

At operation 306, the training data is cleaned to fill in missing data or remove unnecessary data. In example embodiments, a visual representation of the map data structure (e.g., as generated during the monitoring process) may be presented within a graphical user interface. The graphical user interface may include interactive user interface elements for filtering the map (e.g., by specific tasks, people, roles, or commands) and for editing the data.

At operation 308, correlations in the data are identified, such as correlations between particular questions asked by a user and particular people, roles, tasks, and commands that are invoked to provide an answer back to the user. In example embodiments, a visual representation of correlations identified in the map data structure may be presented within the graphical user interface. The graphical user interface may include user interface elements for viewing strengths of relationships between data included in various nodes of the map, including back and forth flows of communications and data between the originating, mid-, and end-points. Data that is not highly correlated (e.g., linearly) may be automatically discarded from the data set (or suggested for discarding in the user interface) during the training stage.

At operation 310, one or more initial algorithms are generated from the training data for handling user requests according to the learned business flow of the organization. These algorithms are then tested and improved using supervised machine learning, semi-supervised machine learning, and/or unsupervised machine learning techniques. In example embodiments, supervised learning may include providing a series of labeled inputs for which the correct output is known. Incorrect output is corrected by a teacher (e.g., via the graphical user interface). Corrections are fed back into the system and used for modifying the algorithms (e.g., until an acceptable level of performance is achieved). In example embodiments, unsupervised learning may include modelling of unlabeled data included in the data structure or distribution of the unlabeled data within the data structure to discover clusters of data and associations between data. In example embodiments, semi-supervised machine learning may include taking a mix of unlabeled and labeled input data and predict labels for the unlabeled data based on characteristics inherent in the labeled data. In example embodiments, the predicted labels for the unlabeled data may be presented to a teacher (e.g., via the user interface) for correcting, as necessary.

At operation 312, a digital assistant tool builds user-flow mind maps based on the model of business flows. In example embodiments, the user-flow mind maps are stored in a map or other tree-like data structure in which an input (e.g., a question asked by a user) is mapped to a particular flow through various nodes of the organization, the nodes representing people, roles, and/or tasks, as well as commands issued via the nodes through connections to one or more back-end systems and responses returned to the user (e.g., aggregated and formatted responses provided as an answer to a question or command submitted by a user at a front-end system).

At operation 314, the digital assistant tool automatically translates the user-flow mind maps into intent and context mappings for use with a digital assistant. Here, the intent and context mappings may be inferred based on the data included in the nodes of the mind map, including data pertaining to the people, roles, tasks involved in processing requests, the commands that are issued to the back-end system, and the way in which responses are processed, aggregated, and presented to a user (e.g., via supported input and output user interface mechanisms of the front end systems).

At operation 316, a particular interaction platform is selected (e.g., Google Assistant, Skype, Slack, Alexa, and so on). In example embodiments, the selection is based on the front-end system(s) deployed in the organizational environment.

At operation 318, the intents for the particular selected interaction platform may be presented within a graphical user interface for editing. In example embodiments, missing information that is supported by a particular digital assistant platform may be provided, such as card types, image/video, graph information, button information, and data requirements. Additionally, the intent and context mapping may be modified. Any changes made during the editing stage may then be fed back as inputs into the training data for generation of a new or updated model.

At operation 320, the mappings are deployed with respect to the selected interaction platform.

At operation 322, combined (e.g., cross-platform) code is executed for performing intent-to-handler conversions. Here, the learned mappings of particular combinations of contexts and intents are mapped to specific user flows (e.g., implemented as handlers). For example, a particular combination of a context and an intent may be mapped to a particular node in the user flow map. Then one or more tasks, branches, or pathways from that node to other nodes in the workflow map may be ranked and presented to a user (e.g., via one or more of the user interfaces described herein) as options to assist the user in performing one or more tasks. In example embodiments, a web request (e.g., "chathook") sequence (e.g., see FIG. 5) may be implemented to process requests at various chatbots or digital assistants. One or more identified tasks or sub-tasks identified at corresponding nodes may then be surfaced in one or more user interfaces of the applications (e.g., digital assistants) executing on a client device (E.g., see FIGS. 6-7).

At operation 324, code in separate modules is executed for each agent for performing platform-specific handler operations.

At operation 326, if the platform is not Alexa, code templates and APIs are generated within a dialog flow tool for handling chatbot interactions, including processing of intents, context, entities, parameters, actions, and fulfillment. For example, Slack is a cloud-based set of proprietary team collaboration tools and services environment that offers integration of external bots. These bots are usually hosted in ABS, as discussed below. Alternatively, direct integration into Google's DialogFlow is also possible. Once a bot is integrated into Slack app, any user can interact with it.

At operation 328, if the fulfillment method supports integration with Azure Bot Service (ABS) (e.g., such as Microsoft products, including Skype for Business, Microsoft Teams), a bot connector is built in ABS. The ABS portal allows for building of bots (e.g., Functions Bots) that can be integrated into several "channels" (e.g., Skype for Business, Microsoft Teams, Kik, Twilio, and so on). ABS offers multiple ways to build bots, including (1) MS Bot Builder SDK and (2) Connect a Functions Bot to an external chatbot (like Google's DialogFlow).

At operation 330, if the Digital Assistant uses the Alexa platform, code templates and APIs are generated within the Alexa Developer Portal (e.g., for handling invocation name, intents, and user utterances). Amazon Developer Console offers a dedicated portal (called Alexa Skills Kit) for bots that are built for Alexa devices. The concept is similar to other bot development environments. A unique invocation name is needed, user utterances are used to build Intents and custom slots are used for keywords or parameters. A service endpoint (which is a secure connection to the disclosed usability applications) allows for each Intent to connect into code and display rich graphics with text and voice combinations. Each Intent represents a step in the conversation flow.

At operation 332, user acceptance testing is performed. Any additional data pertaining to inputs, workflows, and outputs gathered during user acceptance testing may be included in an additional set of training data for improving the workflow model.

Figure 4:
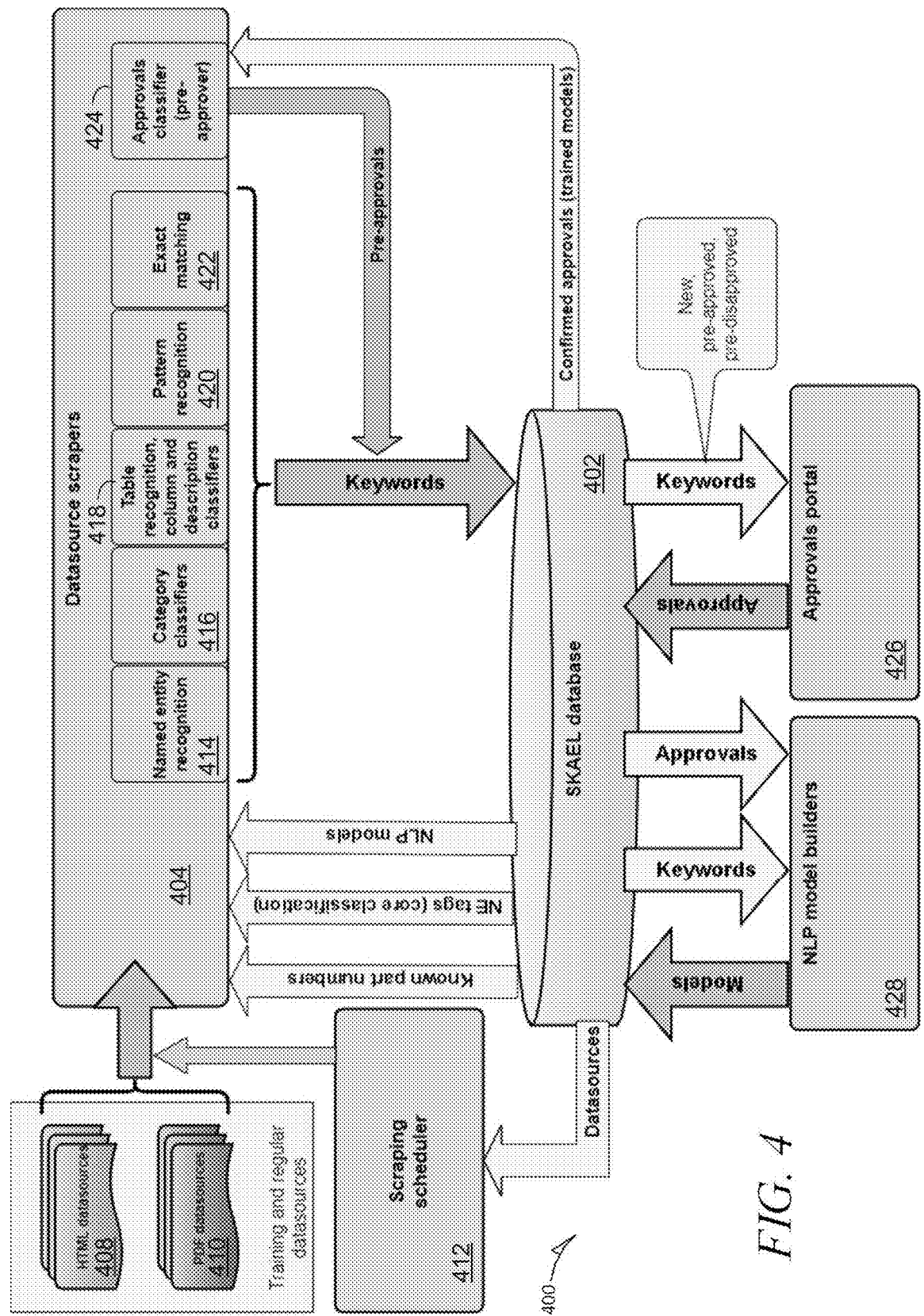
FIG. 4 is a block diagram illustrating example components of the looking module of FIG. 2.

FIG. 4 is a block diagram illustrating example components 400 of the looking module of FIG. 2.

A specially-configured database system 402 is configured to match queries including natural language parameters to source data accessible from one or more private data sources or public data sources. The database system 402 uses machine learning techniques to match keywords included in the queries to data fields included in the data sources. For example, the database system 402 receives NLP models from NLP model builders 404. The NLP models may be trained using supervised machine learning, semi-supervised machine learning, and/or unsupervised machine learning techniques, as described above with respect to mapping of contexts and intents to workflow maps. For example, NLP models may be generated from training data sets that include at least some known matches between NLP keywords and data fields (e.g., part numbers) specified in the data sources. Through training, the models may be improved to identify additional matches between keywords and data fields (e.g., until predetermined thresholds of accuracy are reached).

In example embodiments, one or more data source scrapers 404 scrape one or more data sources 406, such as HTML data sources 408 and PDF data sources 410, comprising public data or private data (e.g., data that is specific to the organizational environment, such as data associated with one or more of the back-end systems of the organizational environment). In example embodiments, the data source scrapers may be scheduled to execute by a scraping scheduler 412 (e.g., at predetermined time intervals). In example embodiments, each of the data source scrapers has modules for incorporating named entity recognition 414, category classification 416, table recognition, including column and description classification 418, pattern recognition 420, and exact matching 422 into the machine-learning algorithm. By incorporating HTML-based patterns reflecting structures of the input documents, as well as by incorporating data patterns of tables within the input documents, the matching of the keywords to data fields is expanded beyond mere sentence-based matching.

In example embodiments, classification of the data sources is performed by an approvals (pre-approvals) classifier 424, which works initially from confirmed approvals (e.g., trained models) received from the database system 402. Additional classifications identified (e.g., through the various machine learning techniques described herein), along with corresponding keywords identified by the data scrapers, are communicated from the database scrapers to the database system 402.

In example embodiments, the additional classifications, including new, pre-approved, and pre-disapproved keywords, are communicated to an approvals portal 426. The approvals portal 426 may then communicate one or more additional approvals to the database system 402 for updating of the models received by the database system 402 from the NLP model builders 404.

In example embodiments, utilizing the various techniques from Data Source Scrapers, product images, keywords, part numbers and product descriptions may be read and properly tagged from each data source (e.g., HTML, Word, and PDF docs). Once this process is complete, the keywords are placed in major buckets and presented to the "model trainer/teacher" via the Approval Portal. The buckets may include, for example, (1) Approved, (2) Disapproved, (3) Pre-Approved, (4) Pre-Disapproved, (5) Manage Key Tags, and (6) Images.

The NLP model builders 428 (e.g., "model trainer") review the data sources (e.g., as humans would read it) and confirms/rejects/adjusts the tags for each keyword, part number, and product description that the Data Source Scraping mechanism has originally applied. The trainer may also pick the correct product image for this data source. The various buckets signify the keyword repositories that are utilized to assess how well the machine learning algorithm is working. Approved bucket has all the keywords that the ML algorithm has learned over time and it automatically places the right keywords in there. Similarly, the Disapproved bucket is where previously all disapproved keywords are placed. The Pre-Approved and Pre-Disapproved buckets are where the machine is proactively inserting keywords, replacing the human function (overtime). The Manage Key Tags is a "catch all" repository of all keywords, that are useful to review and then adjust any keyword that was missed in the other buckets.

Once the data source approval is Complete, the newly adjusted keywords with the associated tags are used to reinforce the Data Scraping Algorithm.

As an example of machine-learning as applied to part numbers, consider one or more queries that come into the database system 402 through one of the machine-learned workflow pathways discussed above, the one or more queries generated from an initial user question posed by a user at an originating point of the workflow to provide a listing of all an organization's assets that are video displays that have five or more HDMI ports. Here, natural language processing may be used to match one or more parameters of the one or more queries, specified as natural language, to private asset management data sources identifying assets owned by the organization. Here, it may be determined through machine learning that the intent of the query is to identify a number of assets of a particular type (e.g., a number of displays) associated with the organization that have a particular attribute or characteristic (e.g., five HDMI ports). Based on information derived from scraping of the private data sources being only able to satisfy a portion of the question posed by the user (e.g., the number of displays owned by the organization), information derived from scraping of public data sources is used to answer the remaining portion of the question.

In particular, from the private data sources, the scrapers may be able to identify a model number or part number associated with each asset (e.g., from purchase receipts or other internal transaction records). The model number may then be associated with a specification of characteristics associated with the model number, including the particular characteristic requested by the user (e.g., the number of HDMI ports). Thus, correlations may be drawn between data fields included in the private data (e.g., model numbers) and data fields available from public data sources (e.g., data sources included in specifications associated with the model numbers). Correlations may also be drawn between the natural language query originally posed by the user and the one or more database queries that are generated to satisfy the natural language query. One or more responses to the database queries may then be returned (e.g., as an aggregated and formatted NLP, visual, or voice response) that answers both parts of the question posed by the user.

In example embodiments, the classifier may be implemented as a Naïve Bayes classifier that calculates a probability that one or more natural language keywords correspond to a particular set of database queries and responses (e.g., that correspond to one of the machine-learned organizational workflows) that are known to flow into and out of the database system.

As another example, consider part number scraping. A hardware item can have many different types of part numbers, each of which may be extracted out from the dataset as possible ways in which a user may conduct a search for the hardware item. Thus, machine-learning may be employed to identify the probability that a particular NLP database query parameter refers to a particular part number classification, such as a unit, module, cable, accessory, license, or description classification. Tables in public and private data sources may be extracted. The table columns may be classified by tags (e.g., based on column captions or headers). Columns may be checked for a description column, which may be classified with a description tag. Table rows may be iterated over and classified based on their descriptions (or, if not classified by a description, a column's default tag may be used). Values extracted from the tables may be saved along with their tags into the database, preserving (partially) the source table data structure.

Figure 5:
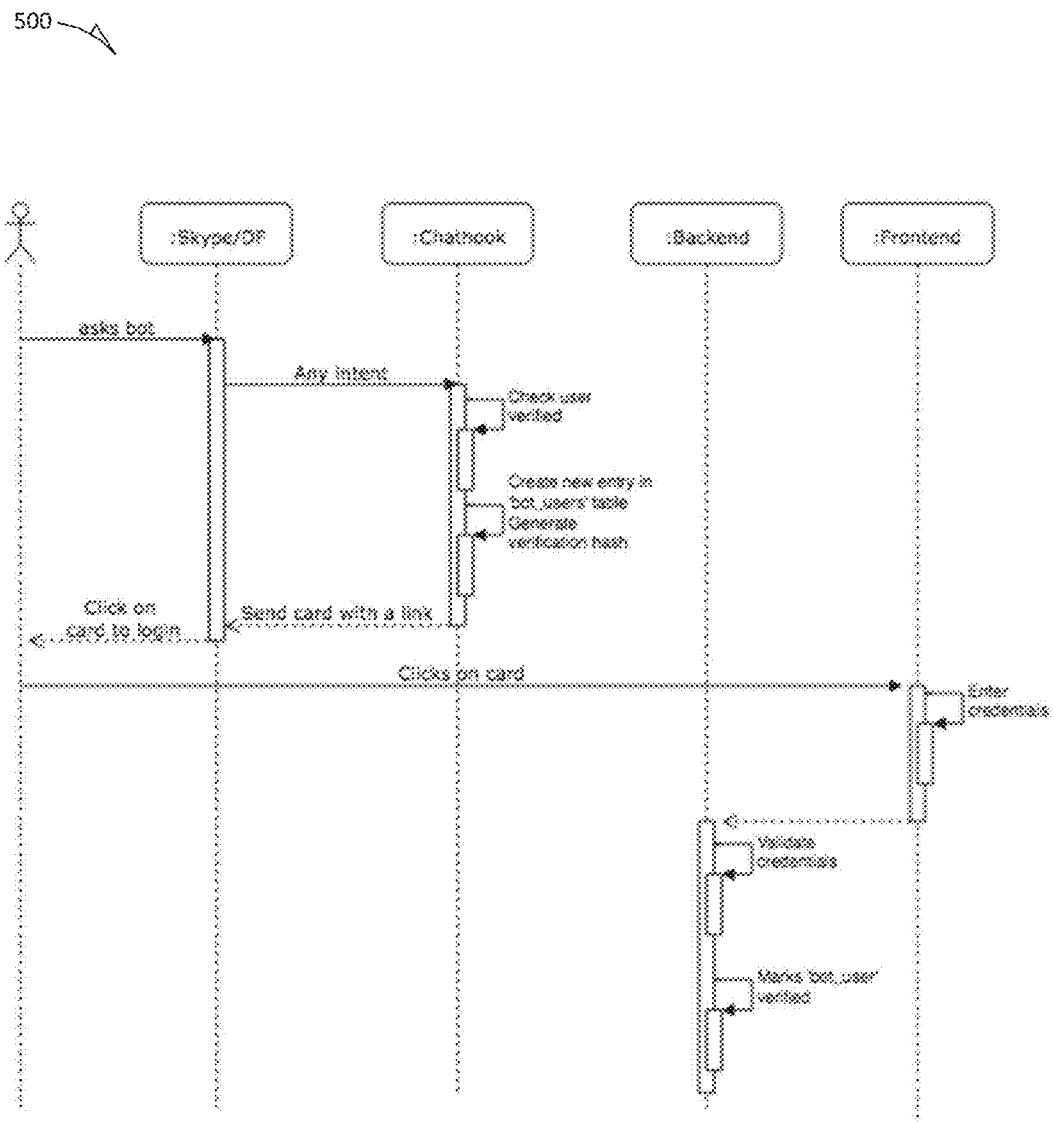
FIG. 5 is a chart depicting a web request service that connects one or more applications executing on the front-end systems (e.g., chatbots or digital assistants) to the functionality provided by one or more back-end systems via the usability applications.

FIG. 5 is a chart 500 depicting a web request service that connects one or more applications executing on the front-end systems (e.g., chatbots or digital assistants) to the functionality provided by one or more back-end systems via the usability applications 120. As depicted, a user first asks or submits a question via one of the front-end systems. The web request service determines one or more of the context, intent, or classification corresponding to the request and identifies a node of a workflow (e.g., a Skype dialog flow) corresponding to the request. The web request service checks for verification of the user, creates an entry in a database (e.g., "bot_users" table), and generates a verification hash. The web request service then prompts the user to login (e.g., via a clickable display card supported by the messaging platform, voice prompt, or other user interaction supported by the front-end systems). Upon engagement with the interaction prompt, the user is prompted via the front-end systems to enter the user's credentials. Upon verification of the user's credential by the back-end systems, the entry in the database table is marked as verified.

Various front-end applications, such Amazon Alexa, and Google Assistant, as well as technologies to enable the front-end applications (e.g., Dialogflow) may have a number of limitations regarding keeping sessions alive. To be able to restore expired external sessions if needed, internal sessions are introduced. In example embodiments, an internal session is kept in synch with an external session; therefore, each internal session is updated on each request to be in synch with its corresponding external session. If an external session is deemed to be expired by the application (e.g., if a new external session ID is received or requested), the new session of the external system may nevertheless be populated with context values from one or more old sessions using the internal session data. Thus, sessions that are considered to be expired with respect to a front-end application may be restored from the internal session data. Furthermore, histories across external sessions may be maintained and stored together as internal session data.

Figure 6:
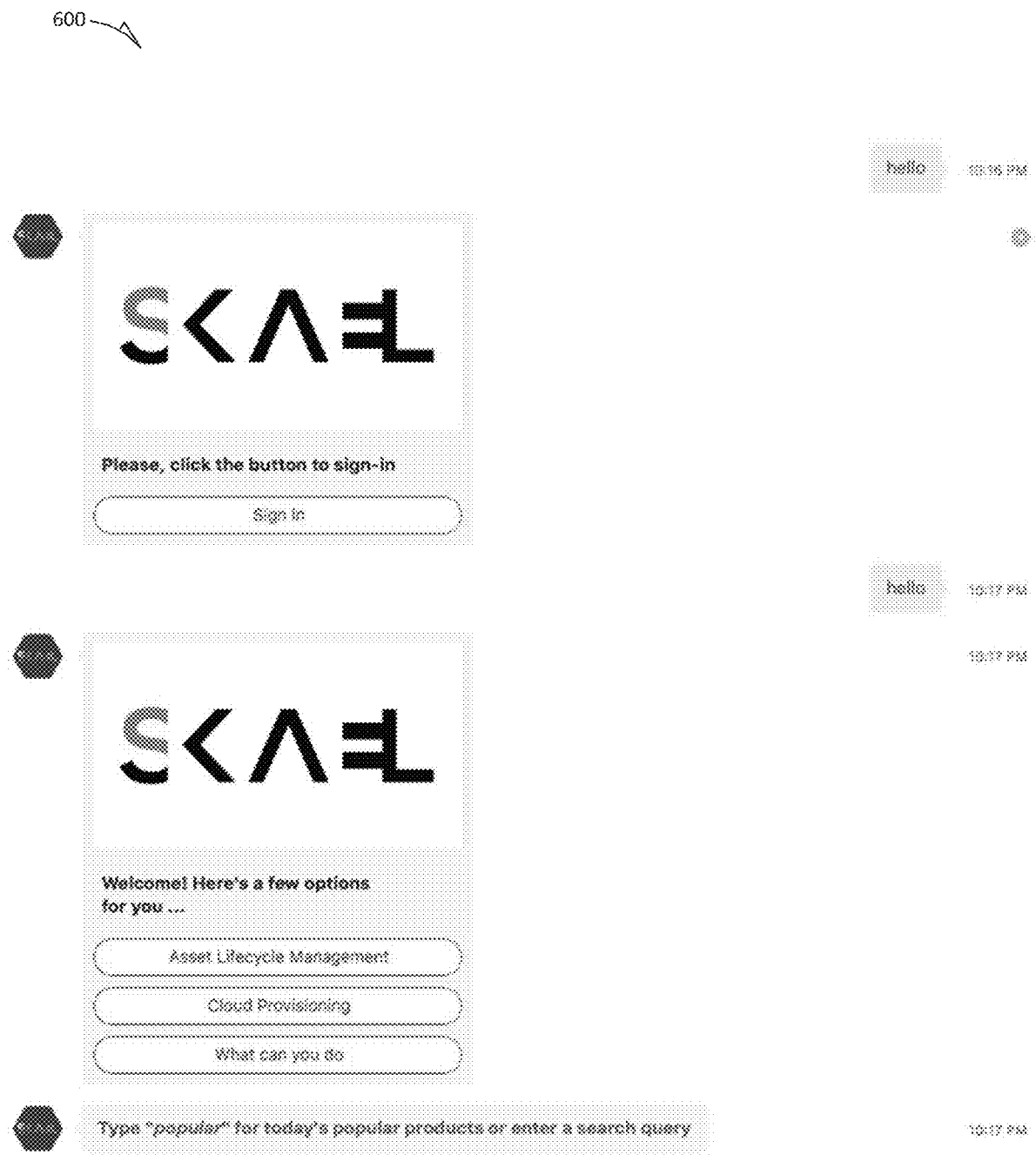
FIG. 6 depicts an example user interface for interacting with a digital assistant application.

FIG. 6 depicts an example user interface 600 for interacting with a digital assistant application. Upon the user providing the digital assistant's wake word and/or invocation name of a skill of the digital assistant (e.g., a sub-application executing within the environment of a specific digital assistant) as an utterance (e.g., "Hello"), the digital assistant determines that the user has not yet been verified or authenticated and prompts the user to sign in to the system (e.g., by communicating a card for presentation on a client device). The user may then follow a process for signing into the skill (e.g., see FIG. 5). Upon the user providing an utterance of the digital assistant's wake word and/or the invocation name of the skill again, the digital assistant may determine that the user has completed the sign in process and provides the user with a workflow options corresponding to an originating node in a machine-learned workflow of the user's organization that corresponds to known information about the user, such as the user's role within the organization, the user's access privileges, and so on.

The workflow options may be surfaced as user interface elements of a card associated with the originating node or simply provided via voice output or another user interaction mode supported by the application (e.g., digital assistant) executing on the front-end system. Thus, for example, the user may be presented with user interface elements corresponding to a top number (e.g., the top three) most likely tasks that the user may wish to perform upon logging into the system. The prediction may be based on insights generated by the learning module with respect to the characteristics or attributes of the user with respect to other similarly situated users in the organization or other organizations, characteristics of the user's organization with respect to organizations having similar characteristics, or other machine-learned factors pertaining to an initial interaction of the user upon logging into the system. Here, for example, perhaps based on the user having a purchasing role within the organization, the user is provided with navigational pathways into the system that may be accessed by utterances corresponding to "asset lifecycle management," "cloud provisioning," and "what you can do." Furthermore, the user may be provided with a hint pertaining to an action the user may wish to perform based on the user's context (e.g., list today's popular products).

Figure 7:
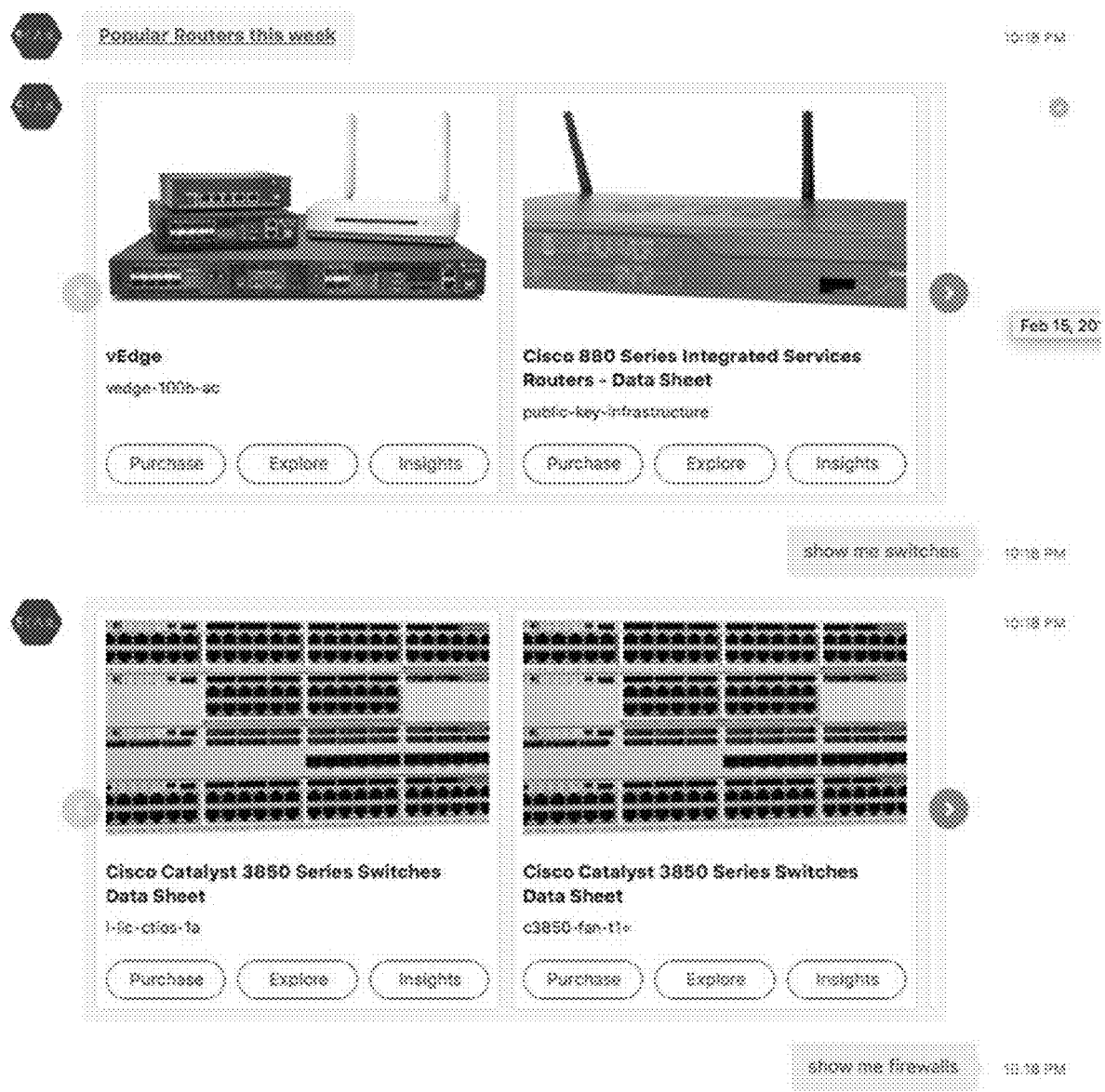
FIG. 7 depicts an example user interface for interacting with a digital assistant application to browse items for purchasing by a user on behalf of an organization.

FIG. 7 depicts an example user interface 700 for interacting with a digital assistant application to browse items for purchasing by a user on behalf of an organization. Upon the user providing an utterance corresponding to (e.g., "popular routers this week"), the digital assistant identifies an additional node in the workflow that corresponds to the utterance, as well as an associated next action corresponding to the additional node. At this stage, based on application of machine learning techniques discussed above, the digital assistant may identify the context of the user as a "purchase" context. Additionally, an intent of the user to receive a listing of popular routers may be inferred from NLP processing of the utterance in conjunction with the context. In this case, scraped public data sources may be searched for popularity of routers and cross-checked against private data pertaining to types of routers approved for purchase by the user's organization. Again, the most probable branches in an identified node of the workflow may be presented to the user as one or more interactive user interface elements, such as buttons on a card associated with each of the identified routers in the list. Here, the next predicted actions for the user "Purchase," "Explore," and "Insights."

Upon the user providing an utterance corresponding to switches (e.g., "show me switches,"), the digital assistant infers, based on discussed machine-learning of user workflows, that the user intends to now view popular switches. Again, the scraped public data sources are cross-checked against the scraped private data sources of the organization and a response to the user's utterance is provided in the form of a list of popular switches as well as next predicted actions for the user with respect to the switches (e.g., "Purchase," "Explore," and "Insights.")

Although not depicted in FIG. 7, engagement of the "Insights" interactive element of a particular item in either of the routers or switches listings would result in the user being presented with anonymized insights pertaining to the selected router or switch as it pertains the user's role within the organization. The insights presented may be based on machine-learned factors that other similarly situated users have found to be valuable in aiding the user with respect to the purchasing task that the user intends to complete. For example, the user may be presented with information relevant to use of the selected router or switch within other organizations having similar attributes as the user's organization. Such insights may be provided to the user in an anonymized and/or aggregated form such that the privacy of the data collected from the other organizations is maintained, but such that valuable information pertaining to the selected router or switch (e.g., number of similar routers deployed in other organizations, prices paid for the routers by other organizations, suppliers from which the router was purchased by other organizations, trouble tickets or other feedback submitted by other organizations pertaining to the router or switch, and so on), is conveyed to the user to aid the user in making a purchasing decision.

Figure 8:
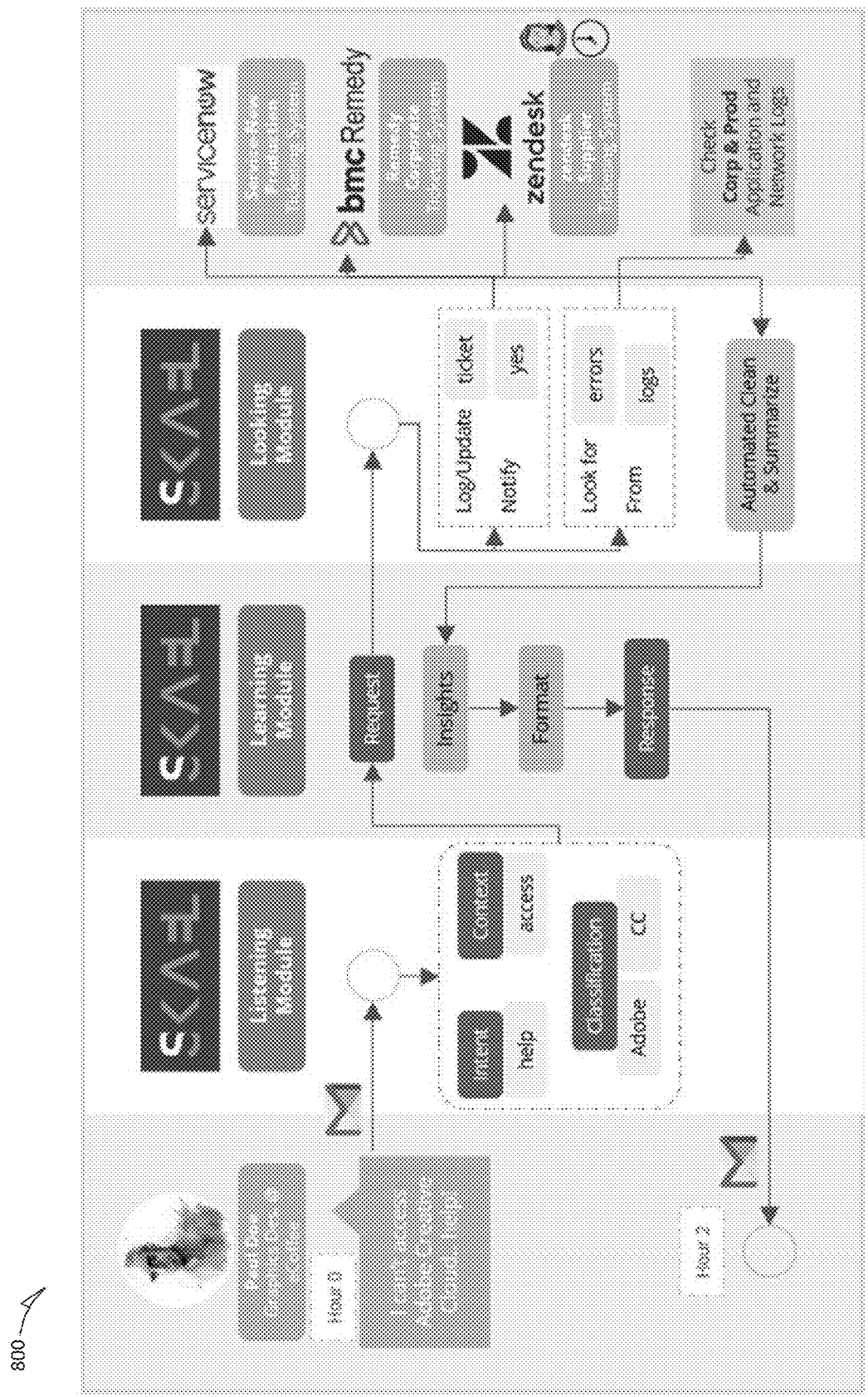
FIG. 8 depicts an example scenario for improving the speed of performing a ticket-processing task within an organizational environment.

FIG. 8 depicts an example scenario 800 for improving the speed of performing a ticket-processing task within an organizational environment.

Here, a user has signed into an application executing on a front-end system of the organization and has provided an NLP utterance: "I can't access Adobe Creative Cloud . . . help!" The listening module 202 identifies an intent ("help"), a context ("access"), and two classifications ("Adobe" and "CC") corresponding to the query. Based on a machined-learned mapping of the query to a machine-learned pathway into one or more of the back-end systems deployed within the organization, as discussed above, the learning module 204 automatically submits one or more requests to one or more back-end systems deployed within the organization on behalf of the user.

The looking module 206 then maps the requests from the learning module to particular machine-learned pathways into the back-end systems, starting with a servicenow production ticketing system, and moving downstream to other ticketing systems, as necessary, such as a bmc Remedy corporate ticketing system and a Zendesk supplier ticketing system. As part of the ticket-generation process, the looking module 206 automatically checks corporate and production application and network logs for errors that are relevant to the intent, context, and classification of the query, and makes independent determinations (e.g., based on organizational rules) of whether further downstream processing through corporate and supplier ticketing systems is necessary. Additionally, upon receiving responses from the one or more back-end systems, the looking module 206 automatically cleans and summarizes the response data according to pre-defined organizational rules and generates updates to insights pertaining to the submission of the ticket and resolution of the ticket for use as training data and for subsequent anonymized disclosure across multiple organizations.

In example embodiments, this scenario of automated ticketing and resolution results in the user receiving a resolution up to hours faster than if the user had started a conventional ticket submission by directly accessing employee-facing back-end ticketing systems instead of using the digital assistant. Additionally, the user, by interfacing with the back-end systems using the digital assistant, is not burdened with learning the complexities of the individual back-end systems that are used to resolve the ticket. Downstream processing is streamlined based on machine-learned rules corresponding to the ticketing workflow, such as when tickets must be opened with the corporate ticketing system and which information must be provided to the corporate ticketing system and when tickets must be opened with the supplier support system and which information must be provided to the supplier ticketing system.

The necessary information is automatically collected from scraped data sources and provided to the downstream support systems. Upon resolution at each stage of the workflow, responses are aggregated and formatted for appropriate presentation to the user according to organizational rules pertaining to formatting of the resolution. In example embodiments, because of the automation of workflow, bottlenecks formed as a result of manual tasks performed by people having particular ticketing support roles within the organization are reduced or eliminated for at least the most common ticketing tasks. Furthermore, the repertoire of the machine-learning system for handling tickets grows as more and more tickets are entered, new workflows are discovered and incorporated into the machine-learning models, and new insights are generated and distributed across organizations on which instances of the systems disclosed herein are deployed.

Figure 9:
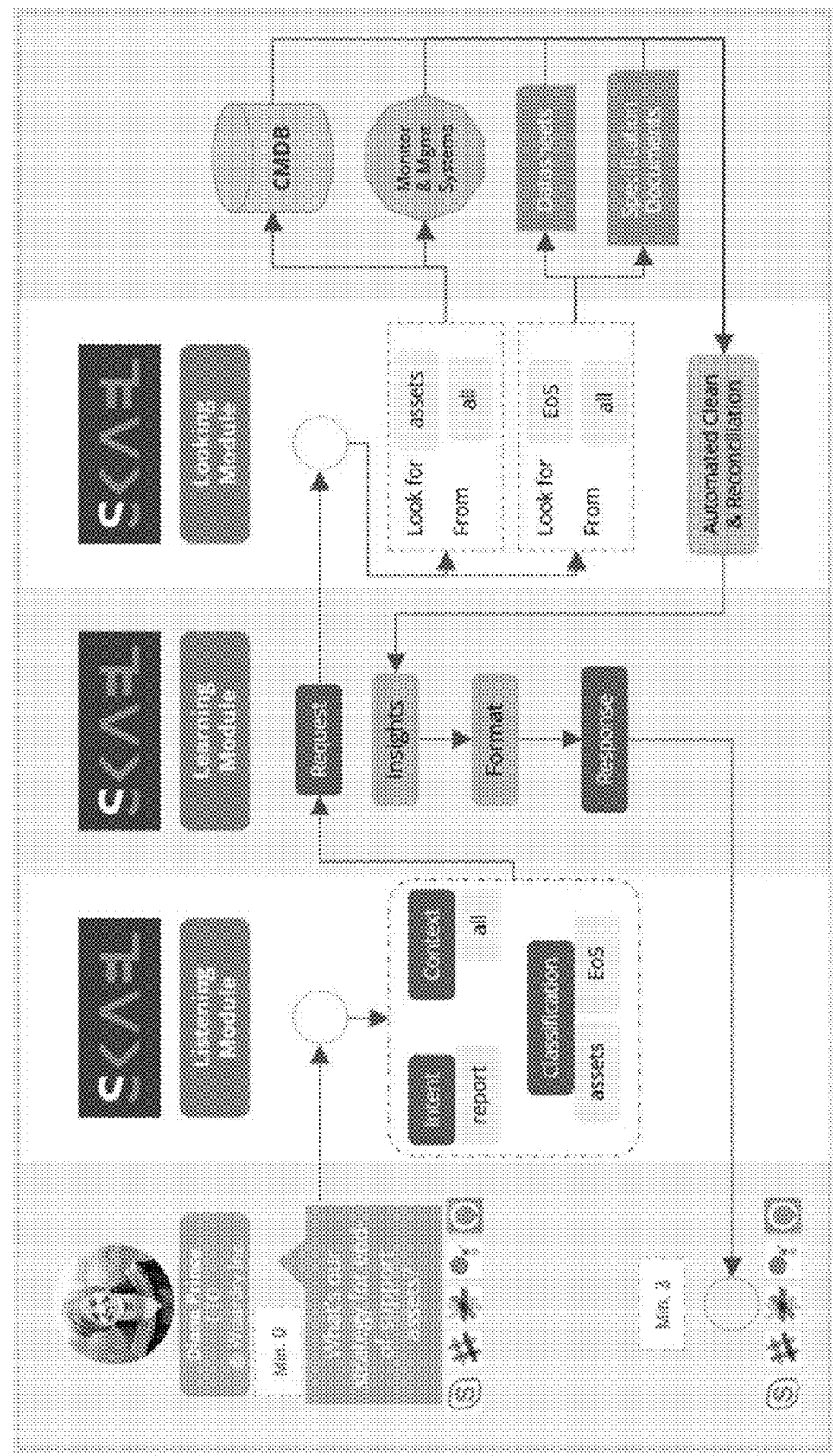
FIG. 9 depicts an example scenario for improving the speed of performing an asset management task within an organizational environment.

FIG. 9 depicts an example scenario 900 for improving the speed of performing an asset management task within an organizational environment. Here, a user has signed into an application executing on a front-end system of the organization and has provided an NLP utterance: "What's our strategy for end-of-support assets?" The listening module 202 identifies an intent ("report"), a context ("all"), and two classifications ("assets" and "EoS") corresponding to the query.

Based on a machined-learned mapping of the query to a machine-learned pathway into one or more of the back-end systems deployed within the organization, as discussed above, the learning module 204 automatically submits one or more requests to one or more back-end systems deployed within the organization on behalf of the user.

The looking module 206 then maps the requests from the learning module 204 to particular machine-learned pathways into the back-end systems. Here, the looking module 206 submits database queries for "assets" scraped from all data sources and "EoS" scraped from all data sources, including private and public data sources. Here, the private data sources include a configuration management database (CMDB) as well as monitoring and management systems deployed within the organization. The public data sources include data sheets and specification documents.

The looking module 206 automatically cleans and reconciles the responses to the various database queries and generates insights pertaining to the workflow through which the original NLP query was resolved. The insights may then be used for updating the machine-learning models and or providing anonymized tips to other organizations for reporting on end-of-support assets. In example embodiments, the data sources used, the data items extracted from the data sources, the reconciliation of the data items, and the final reporting of the end-of-support assets is based on machine learning of tasks completed by previously by other members of the organization in response to a similar query having been received, reducing the response time by up to days. Again, the user submitting the query through the intelligent agent need not know much about how to use the underlying systems, the workflow that is used to produce the results, the algorithms that are used for reconciliation of the data, or the formatting that is required for the output of the report. Instead, the user need only know how to submit a natural language command that will trigger the intelligent agent to access to the proper machine-learned pathways or workflows for providing the information that the user needs.

Figure 10:
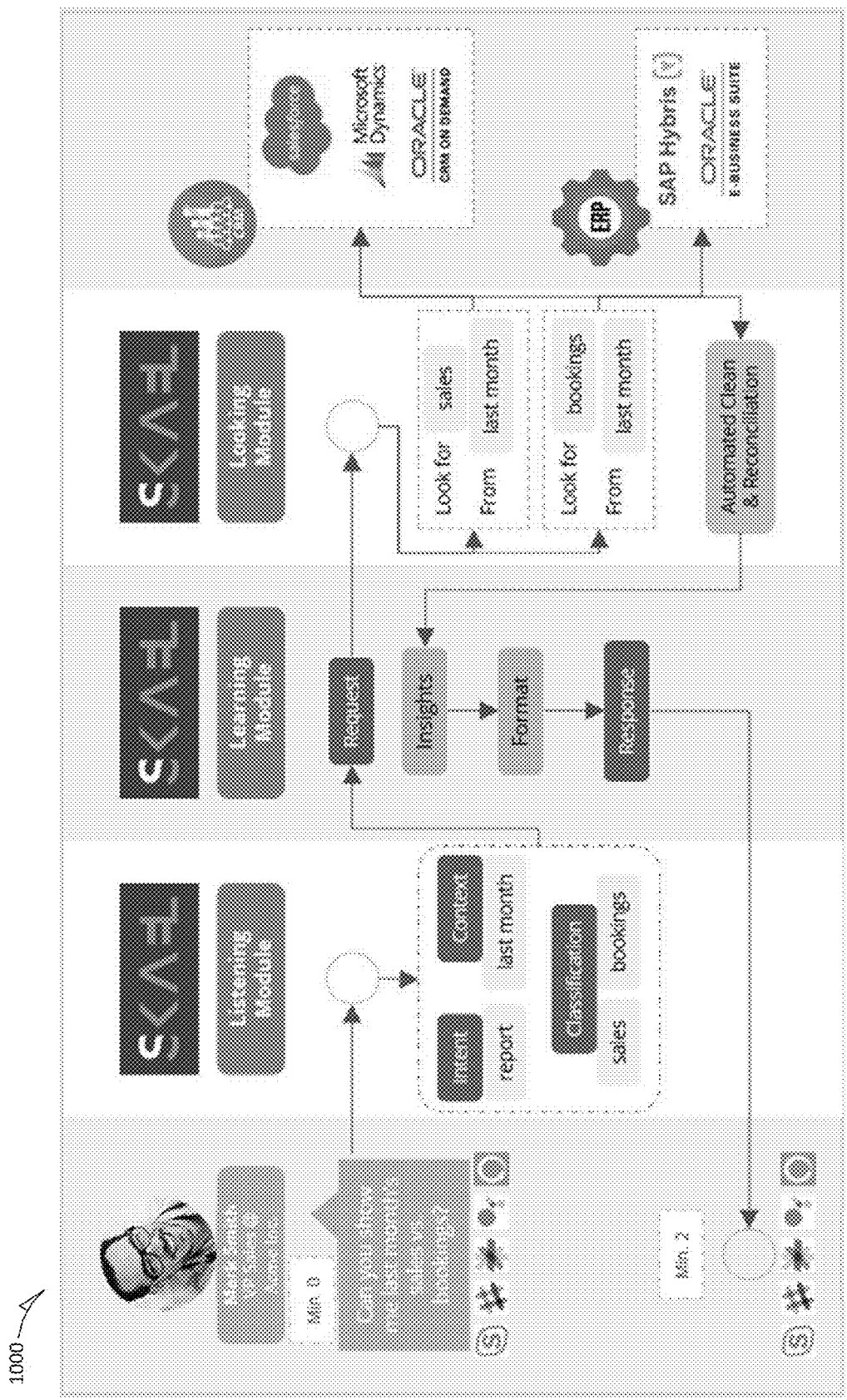
FIG. 10 depicts an example scenario for improving the speed of performing an accounting task within an organizational environment.

FIG. 10 depicts an example scenario 1000 for improving the speed of performing an accounting task within an organizational environment. Here, a user has signed into an application executing on a front-end system of the organization and has provided an NLP utterance: "Can you show me last month's sales vs. bookings?" The listening module 202 identifies an intent ("report"), a context ("last month"), and two classifications ("sales" and "bookings") corresponding to the query.

Based on a machined-learned mapping of the query to a machine-learned pathway into one or more of the back-end systems deployed within the organization, as discussed above, the learning module 204 automatically submits one or more requests to one or more back-end systems deployed within the organization on behalf of the user.

The looking module 206 then maps the requests from the learning module 204 to particular machine-learned pathways into the back-end systems. Here, the looking module 206 submits database queries for "sales" from "last month" and "bookings" from "last month. Here, the data sources that are queried include CRM applications (e.g., Salesforce, Microsoft Dynamics, or Oracle CRM on Demand) and ERP applications (e.g., SAP Hybris or Oracle E-Business Suite).

The looking module 206 automatically cleans and reconciles the responses to the various database queries and generates insights pertaining to the workflow through which the original NLP query was resolved. The insights may then be used for updating the machine-learning models and or providing anonymized tips to other organizations for generating similar reports. In example embodiments, the data sources used, the data items extracted from the data sources, the reconciliation of the data items, and the final reporting pertaining to the accounting task is based on machine learning of tasks completed previously by other members of the organization in response to a similar query having been received, reducing the response time by up to days.

Figure 11:
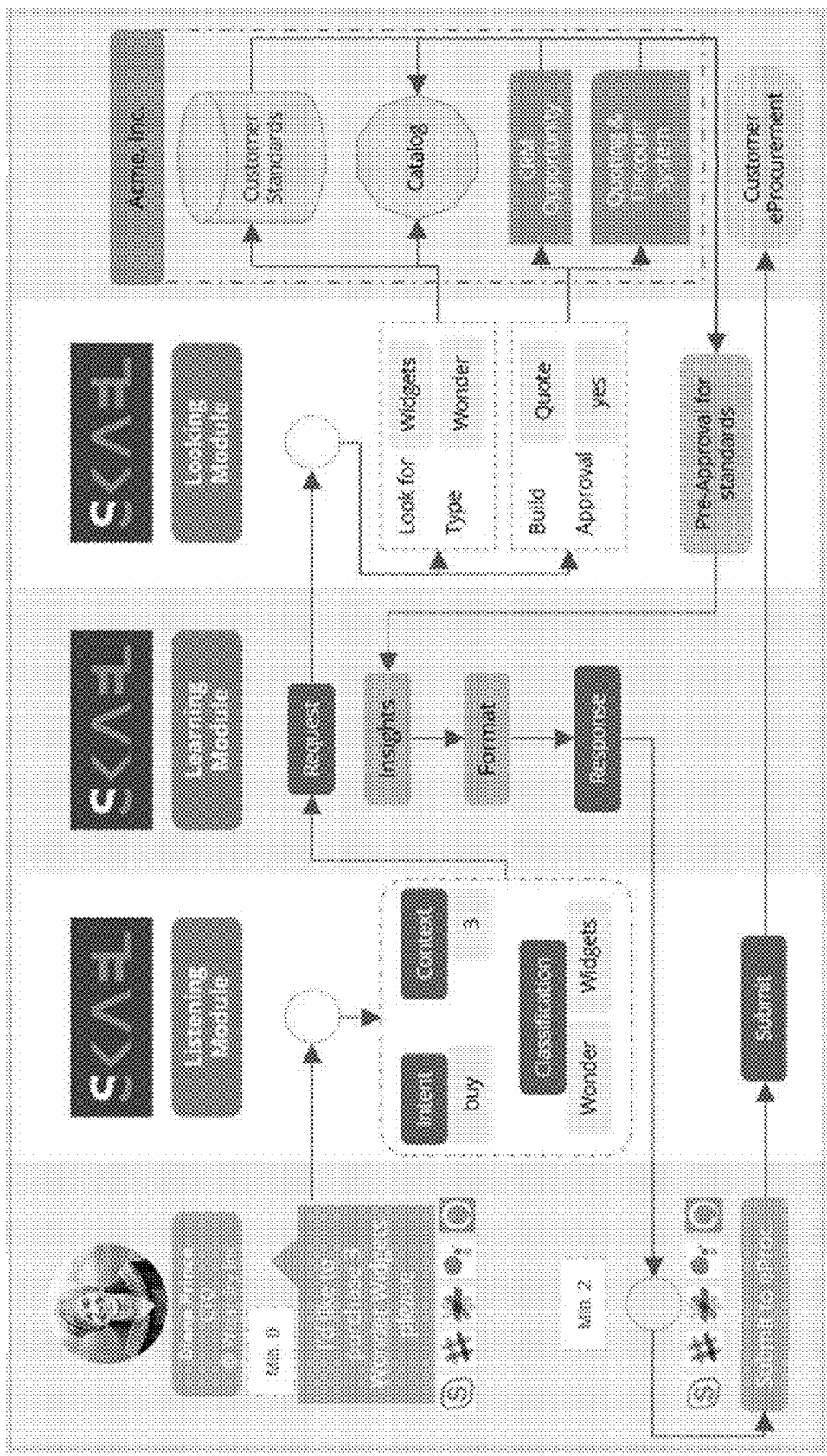
FIG. 11 depicts an example scenario for improving the speed of performing a purchasing task within an organizational environment.

FIG. 11 depicts an example scenario 1100 for improving the speed of performing a purchasing task within an organizational environment. Here, a user has signed into an application executing on a front-end system of the organization and has provided an NLP utterance: "I'd like to purchase 3 Wonder Widgets please." The listening module 202 identifies an intent ("buy"), a context ("3"), and two classifications ("Wonder" and "Widgets") corresponding to the query.

Based on a machined-learned mapping of the query to a machine-learned pathway into one or more of the back-end systems deployed within the organization, as discussed above, the learning module 204 automatically submits one or more requests to one or more back-end systems deployed within the organization on behalf of the user.

The looking module 206 then maps the requests from the learning module 204 to particular machine-learned pathways into the back-end systems. Here, the looking module 206 submits database queries for "Widgets" of type "Wonder." Additionally, the looking module 206 generates a request to build a quote with an approval. Here, the data sources include customer standards and purchasing catalogs available from a third-party supplier. And the back-end functionality that is invoked includes functions pertaining to CRM Opportunities and Quoting and Discounts, which are merged into the quote that is built using the third-party systems.

The looking module 206 automatically obtains pre-approvals for machine-learned standard purchases and stores information pertaining to the request (e.g., as one or more insights). The insights may then be used for updating the machine-learning models and or providing anonymized tips to other organizations for generating similar reports. In example embodiments, the data sources used, the data items extracted from the data sources, the reconciliation of the data items, and the final reporting of the quote is based on machine learning of tasks completed by previously by other members of the organization in response to a similar query having been received, reducing the response time by up to days.

In example embodiments, for items for which pre-approval is received (within minutes), the user may simply provide an additional utterance to the digital assistant to automatically complete the order. The intelligent agent then submits the order automatically using the user organization's eProcurement solution without the user ever having to access the eProcurement solution directly. Once a Purchase Order has been approved, the user will receive a notification which then allows the respective Purchase Order to be booked directly on the selected supplier's ERP solution.

Organizational Workflow Example

As another example, consider the following purchasing flow that is conducted through a custom skill of Amazon Alexa. Note that this purchasing flow may be generalized as a custom skill for deployment on any other digital assistant, such as Google Assistant, Microsoft Cortana, or any other digital assistant listed herein. A user having a purchasing role within an organization and having access to a front-end system deployed within the organization, such as an Echo Show device, wakes the device using the wake word (e.g., "Alexa") and accesses a purchasing skill of the digital system (e.g., by invoking the skill's invocation word or phrase or a machine-learned, organization-specific variation of the skill's invocation word or phrase). For example, the user says, either through a text or voice utterance, "Purchase requester, are you there?" Upon authentication of the user, the handlers for the skill are invoked and an appropriate (e.g., machine-learned) reply is generated and presented to the user (e.g., as a voice or text utterance and/or as a graphical interactive display card) (e.g., "Purchase requester here. How can I help?").

The user indicates, via any supported input mechanism of the front-end system, "I'm looking for an IP phone." In response, the skill replies via any supported output mechanism of the front-end system, "Here are the most popular IP phones . . . " and provides the user with a list of a top number (e.g., the top three) IP phones. In example embodiments, the skill handler for the user's request filters the list based on a combination of internal and external sources to include IP phones that are not only popular, but also pre-approved for purchasing within the organization by the user (e.g., based on attributes of the user, including the user's role within the organization, the user's access privileges, the user's position within the hierarchy of the organization, and so on). In example embodiments, the list may be presented in graphical form, including graphical representations of attributes of the selected IP phones, including brand numbers, model numbers, and photos of the IP phones. The graphical representations may be selectable within a user interface (e.g., to guide the conversation).

In example embodiments, the skill further offers the user a suggested course of action (e.g., based on the most probable path of the user based on machine-learning of workflows of the organization, as discussed above). For example, the skill asks, "Shall I purchase the first IP phone in this list for you?"

The user may then provide an utterance to confirm the intent to purchase the first phone in the list, saying "Yes, purchase phone #1." In response, the skill may automatically complete a purchase order on behalf of the user via the organization's eProcurement system. The skill may further acknowledge the completion of the transaction, saying "I've submitted the order into your eProcurement system."

Upon completion of this workflow, the skill may prompt the user to perform additional tasks (e.g., saying "What would you like to do next?").

The user may then change the subject of the conversation. For example, the user may say "Asset lifecycle" to indicate an intent to access lifecycle management functionality of the back-end systems of the organization.

In response, the skill may determine (e.g., via one or more handlers) the most likely tasks for the user based on the machine-learned organizational workflows corresponding to the user (e.g., based on attributes of the user and/or intra-organizational or cross-organization insights pertaining to the user, as discussed above). For example, the skill may say, "Would you like to see status for all tier one sites or breakdown by locations?"

The user may respond "All tier one sites." In response, the skill may provide a report of data pertaining to asset lifecycle status for all tier one offices of the organization in North America. The particular data included in the report, as well as the formatting of the report, may be based on machine-learned workflows pertaining to this particular type of request from this particular type of user. For example, the report may include a pie chart showing statuses of the various devices of the organization as well as information pertaining to the total number of devices of the organization. The charts and data may be formatted in accordance with templates supported or required by the organization for use by the user.

The skill may then prompt the user for the next set of likely tasks, such as by saying "Would you like me to pull up information about San Francisco, New York or London?"

At any point, the user may change the subject slightly, saying "breakdown by location." In response, the skill may identify the new direction of the conversation. For example, the skill may determine that the user intends to return to a previously unselected option of a recently accessed node of the current workflow—specifically, now the user wishes to see the statuses of assets broken down by location instead of statuses of assets at all tier one sites.

Furthermore, the skill may provide the user with a list of the most likely locations for which the user may wish to determine asset statuses. The user may then indicate an intention to bring up asset statuses for San Francisco, saying, for example, "Let's look at San Francisco.")

The skill may then identify the next most likely tasks for the user based on the machine-learned workflow of the organization and/or attributes of the user as well as information that may help the user make a decision. For example, the skill may indicate that there are six building within San Francisco and then ask the user whether the user wishes to receive a status of each building or all of the buildings.

In response, the user may say "Show me the status for building 2." The skill may respond with another report including an aggregation of data returned from the back-end systems of the organization, the data being selected and formatted according to machine-learned workflows and/or attributes of the user. In example, the data may be selected and ranked for presentation based on importance of the data with respect to the user's role. For example, the skill may indicate a title of the report (e.g., "Redwood Building Status"), general information about the selected building (e.g., how many assets the building has in general terms, such as a little or a lot of assets), and a breakdown of statuses of various assets, such as a percentage of Cisco routers that are at end of sale, a percentage of Fortinet DDoS that are already past last day of support, a percentage of Cisco switches that are approaching end of software maintenance in the next year, and so on.

The skill may then provide a user with a suggestion for one or more additional tasks to perform, such as asking the user whether to give replacement costs for the assets.

The user may reply "Replacement costs for building 2." In response, the skill may generate a formatted report include an aggregation of back-end system query results corresponding to the request, the workflows of the organization, the machine-learned preferences pertaining to formatting of the results, and information about the user, including the user's role. For example, the skill may indicate replacement costs in building 2 for Cisco Router 3845 (e.g., $33,000) as well as a suggested brand and model number to use for replacement (e.g., "Cisco Router 3945"); replacement costs for Fortinet DDoS 100B (e.g., $22,000) as well as a suggested brand and model number to use for replacement (e.g., Fortinet DDoS 200b); replacement costs for Cisco Switch 4003 (e.g., $175,000) as well as a suggested brand and model number to user for replacement (e.g., "Cisco Switch 4510R"). The replacement costs may also include an estimate for professional services to perform the replacements. In example embodiments, the prices and suggestions are based on scraping of internal and external data pertaining to pricing of the assets as well as cross-organizational insights pertaining to pricing, as discussed in more detail above. The skill may then prompt the user to perform the next most likely task (e.g., getting an official quote).

The user may then change the subject, saying, for example, "altogether." The skill may interpret this request as corresponding to a different node of the machine-learned workflow of the organization's lifecycle management workflow, particularly a branch of the workflow corresponding to asset lifecycle management data for all of the organization's assets in all six of its San Francisco buildings. This determination may be made based on machine-learning of various actions performed by user or other similarly situated users in the past in navigating away from the current node of the workflow. Thus, the skill may respond to the user's request with a report of asset statuses for all assets in all of the organization's six buildings, including formatted charts for representing the aggregated data according to organization's templates. The skill may then prompt the user to perform the next most likely task (e.g., "Would you like to know the immediate capital expense required to upgrade?").

The user may then change the subject, saying, for example, "Show me New York." The skill may interpret this request as a request for a report of high-level data pertaining to assets in New York, such as the most typically requested data and/or most relevant data to the user. This data may include, for example, a general state of the wireless network devices in the organization's New York buildings and a summary information pertaining to assets in the organization's New York buildings that are approaching end of life. The skill may then prompt the user to perform the next most likely task, saying, for example, "I can give you equipment or cost breakdown."

The user may then say, "Equipment breakdown for New York." In response, the skill may generate a report entitled New York Equipment Breakdown, which may include information pertaining to assets approaching end of life, end or support, or end of maintenance, including dates of expiration. Additionally, one or more graphs of the breakdown of the assets in the organization's New York offices may be generated to include an aggregation of the data in accordance with the organization's reporting templates.

The user may then say, "Cost breakdown for New York." In response, the skill may generate a report of the cost breakdown for updating assets in the organization's New York buildings. The skill may then prompt the user to perform the next most likely task (e.g., "Would you like me to get an official quote?")

In response, the user may say, "Yes, get an official quote." In response, the skill may automatically submit a request on behalf of the user to a supplier of the organization that can provide a quote for the upgrade of the assets in the organization's New York buildings. The skill may then inform the user of the submitting of the request, stating, for example, "I've contacted your supplier for an official quote." The skill may then navigate to the next most likely node of the workflow, stating, for example, "Which location would you like to look at next?"

In response, the user may say, "Let's look at London." The skill may interpret the user's request as an intent to receive a high-level report of the assets in the organization's London offices. Thus, the skill may determine the most relevant data present in a high level summary, such as the general status of the organization's London site relative to the other sites (e.g., "This site is the best of all tier one offices") and the most relevant information to the user or the organization pertaining to the assets, such as a percentage of the devices that need attention (e.g., "5%") and brand and model numbers of the assets needing attention (e.g., "Fortinet IPS6500" and "Fortinet WAF50D" assets). The skill may then prompt the user to perform one of the next most likely tasks, saying, for example, "Do you want to know more details like timelines, cost breakdown, or replacement products?"

The user may then say, "London equipment breakdown." In response, the skill may generate a report entitled London Equipment Breakdown that includes end of life and end of support data pertaining to the assets in the organization's London office that require attention. The report may also include one or more graphs representing the relevant data.

The skill may suggest one or more particular brand names and model numbers that would be a good fit for replacing the expiring assets (e.g., "Fortinet IPS7000" and "WAF 100D" assets, respectively.

The user may then say, "Cost breakdown for London?" In response, the skill may generate a report of the cost breakdown for upgrading the assets in the London office requiring attention. The skill may then prompt the user to perform the next most likely action, saying, for example, "Would you like me to get an official quote?" In response, the user may say, "Yes, get an official quote." The skill may then submit a request for the quote through the back-end systems of the organization and say, "I've contacted your supplier for an official quote." The skill may then identify the next most likely node of the workflow, stating, for example, "Which location would you like to look at next?"

The user may then change subject, saying, for example, "How much have we spent this year?" The skill may identify that the user's new request corresponds to a node in the organization's workflow relating to spend analysis. The skill may then generate a report for the user that includes data pertaining to capital expenditures for the user's group within the organization. The report may include, for example, capital expenditures to date relative to the yearly budget and operational expenditures to date relative to the yearly budget. The report may also include information pertaining to quarters that account for percentages of the spend during the year. The report may include one more charts that visually represent the spend analysis data.

The user may then change the subject, saying, for example, "Ticketing report please." In response, the skill may then identify that the user's new request corresponds to a node in the organization's workflow corresponding to ticket volume. The skill may generate a report of ticket volume for the current month, as well highlight the most important or relevant data items pertaining to the user's request. For example, the skill may indicate types of hardware faults in the last month as well as a breakdown of the tickets by people within the organization who have been fielding the tickets.

Upon completing his work, the user may then exit the skill by stating a pre-defined or learned exiting word or phrase, such as "Exit."

Customer-Facing Hotel Guest Management Example

As another example, consider the following hotel guest management example that is conducted through a custom skill of Amazon Alexa. Note that this hotel guest management flow may be generalized as a custom skill for deployment on any other digital assistant, such as Google Assistant, Microsoft Cortana, or any other digital assistant listed herein). A user having checked in at a hotel (e.g., the Wynn hotel in Las Vegas) and having access to a front-end system deployed at the hotel (e.g., in a hotel room of the user), such as an Echo Show device, wakes the device using the wake word (e.g., "Alexa") and accesses a hotel guest management skill of the digital system (e.g., by invoking the skill's invocation word or phrase or a machine-learned, organization-specific variation of the skill's invocation word or phrase). For example, the user says, either through a text or voice utterance, "Hotel Services?" Upon authentication of the user, the handlers for the skill are invoked and an appropriate (e.g., machine-learned) reply is generated and presented to the user (e.g., as a voice or text utterance and/or as a graphical interactive display card) (e.g., "Welcome to the Wynn Hotel in Las Vegas. How may I assist you?"). The skill may provide one or more of the most likely next tasks to the user (e.g., "Dining," "Entertainment," "Nightlife," and so on.)

The user may say "Book a table for dinner tonight." In response, the skill may respond, "Gladly, would you like me to book your usual table at Costa Di Mare?" Thus, the skill may detect the most likely intent of the user based on machine-learning of tasks previously performed by the user or based on insights from users having similar attributes. The skill may also provide a list of the five most likely restaurant choices for the user based on the attributes of the user or insights pertaining to users having similar results. The user may browse information pertaining to the top choices (e.g., using a touch pad of the front-end system).

Upon indicating a selection of a restaurant, the skill may respond, for example, "Great choice. At which time shall I make your reservation?" The skill may also provide available times for the restaurant (e.g., by checking scraped internal or external data accessible to the skill).

The user may decide to choose a different restaurant (e.g., based on a desired time slot not being available at the first restaurant). So, the user might say, for example, "No, let's try Mizumi tonight." The skill may then provide available time slots for user's second restaurant choice. Then, upon the user selecting a time, the skill may automatically make a reservation on behalf of the user (e.g., by issuing one or more commands to a back-end system).

The skill may then notify the user: "Your table has been reserved. May I assist you with anything else?"

The user may reply, "Any shows tonight?" The skill may then say, "We've got special pricing for our red card holders for Le Reve tonight and we still have a couple of seats left for Elvis Costello." Thus, the skill may interact with back-end systems to determine special deals available to the hotel for offering to guests of the hotel as well as inventory of tickets available for popular shows. The choices may be further filtered by known attributes of the user or insights relevant to the user. The skill may provide the user with listings of the top choices for nearby shows, including showtimes and other relevant information.

The user may reply, "La Reve sounds good." In response, the skill may state, "Fantastic. For which time shall I make your reservation?" Additionally, the skill may provide a list of available showtimes based on a checking of ticket inventory via one of more back-end systems. Upon selection of a time, the skill may automatically purchase the tickets for the selected show on behalf of the user and provide the user with information pertaining to the purchase, including a confirmation notification and information about where the user should pick up the tickets.

The user may then say, "Where can I go for some fun tonight?" The skill may then provide the user with top choices for nightlife (e.g., based on the user's attributes and/or scraping of external data sources). Thus, for example, the skill may determine the top night clubs in the area based on public reviews from a reputable source. The skill may reply, "We've got some of the best nightlife on the Las Vegas strip. XS at Encore has been the #1 nightclub in the United States for five years according to Night Life and Bars top 100."

The user may then change the subject, saying, for example, "I need a Thai massage." The skill may then determine that the intent of the user is to make a spa reservation at the hotel for a Thai Oil Fusion massage (e.g., based on the user's attributes and or insights pertaining to similar users). The skill may then provide the user with time slots and options for reserving a Thai Oil Fusion massage at the hotel spa. Based on a selection of one of the options by the user, the skill may then automatically make the reservation on behalf of the user.

The user may say, for example, "Show me my reservations." The skill may then access records associated with reservations made by the user and present them to the user (e.g., for modifying or removing).

Employee On-Boarding Example

As another example, consider employee on-boarding or a similar HR task within an organizational environment. Here, a user may sign into an application executing on a front-end system of the organization and provide an NLP utterance: "On-Board Joe Smalls as an IC level 3." The listening module 202 identifies an intent ("on-board"), a context ("IC3"), and two classifications ("Joe" and "Smalls") corresponding to the query.

Based on a machined-learned mapping of the query to a machine-learned pathway into one or more of the back-end systems deployed within the organization, as discussed above, the learning module 204 automatically submits one or more requests to one or more back-end systems deployed within the organization on behalf of the user.

The looking module 206 then maps the requests from the learning module 204 to particular machine-learned pathways into the back-end systems. Here, the looking module 206 begins configuration of back-end systems to on-board a new employee "Joe Smalls" as an Individual Contributor ("IC") Level 3. Additionally, the looking module 206 generates a purchase request for "laptop" from the selected supplier for "Joe Smalls". Here, the data sources include customer standards and purchasing catalogs available from a third-party supplier. And the back-end functionality that is invoked includes functions pertaining to HRM/HCM functions, ITSM and Ticketing, Physical Security, Learning and Training, Quoting and Discounts and other operational functions, which are merged into a progress and notification system that is built using the third-party systems.

The looking module 206 automatically obtains pre-approvals for machine-learned standard operational tasks, time taken to on-board employees at various levels, purchases related to new employee on-boarding and forecasted delays in the process and stores information pertaining to the request (e.g., as one or more insights). The insights may then be used for updating the machine-learning models and or providing anonymized tips to other organizations for generating similar reports. In example embodiments, the data sources used, the data items extracted from the data sources, the reconciliation of the data items, and the final reporting of the quote is based on machine learning of tasks completed by previously by other members of the organization in response to a similar query having been received, reducing the response time by up to days.

In example embodiments, for items for which pre-approval is received (within minutes), the user may simply provide an additional utterance to the digital assistant to automatically get notified of status or pre-authorize next steps. The intelligent agent then submits each next on-boarding step automatically using the user organization's HRM/HCM, ITSM, Ticketing, Physical Security, Learning and eProcurement solution without the user ever having to access each individual solution directly.

Figure 12:
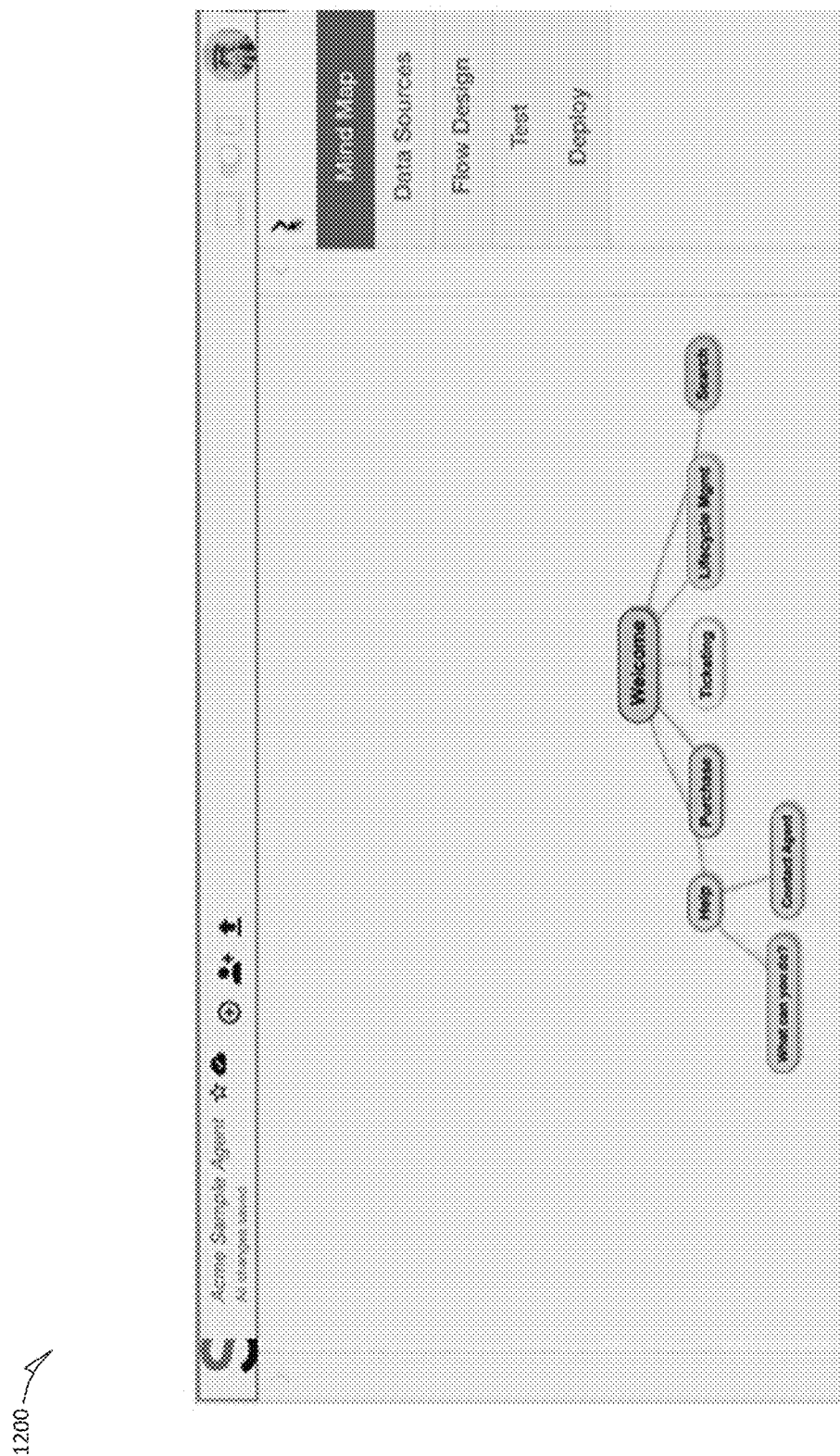
FIG. 12 is an example user interface for performing actions with respect to a machine-learned workflow, such as one of the organizational workflows or other workflows discussed herein.

FIG. 12 is an example user interface 1200 for performing actions with respect to a machine-learned workflow, such as one of the organizational work flows or other workflows discussed herein. In example embodiments, the depicted machine-learned workflow is viewable via selection of a "Mind Map" menu item. The example machine-learned workflow that is depicted in the user interface includes on originating node (e.g., "Welcome") that is connected to five additional nodes, including a "Help" node, a "Purchase" mode, a "Tracking" mode, a "Lifecycle Management" node, and a "Search" node. The "Help" node is, in turn, connected to a "What can you do?" node and a "Contact Agent" node. Each of these nodes represents a location of the depicted workflow that is associated with various data elements, such as reports or other machine-learned data elements, that may be surfaced in user interface elements when each of the nodes is accessed. One or more of the connected nodes may also be surfaced in the user interface as aids in guiding a user through the workflow. Together, the data elements associated with the nodes may be configured to provide a user with easier access to functions and/or data that is accessible to the user via one or more connected back-end systems than if the user had to manually issue commands directly to each of the back-end systems. Each of these nodes is represented as an interactive graphical element that is movable (e.g., via dragging and dropping) for rearranging or editing the workflow, including adding, changing, or removing connections between nodes. In example embodiments, changes made to the workflow may be fed back into the machine-learning algorithms for improving models of the workflow, as discussed above (see, e.g., FIG. 3).

After configuring the mind-maps to adequately match the user organization's business flow, the user will then be able to select their preferred data sources, by clicking on the appropriate logo referencing their data source (e.g., Salesforce, Oracle, SAP, Service-Now, Informatica, Zendesk, CSV files, XML, Custom Datastore, etc.) and entering the respective API/XML token keys and/or connector information. Selecting data sources allows the users to see what data is being read by the system (e.g., by selection of the "View" button), correlate data points across systems via a graphical user interface and save correlation and data priority preferences. The user will also be able to disconnect data sources via a "Deactivate" button, which releases APIXML keys and removes the associated data source from the correlation interface.

Figure 13:
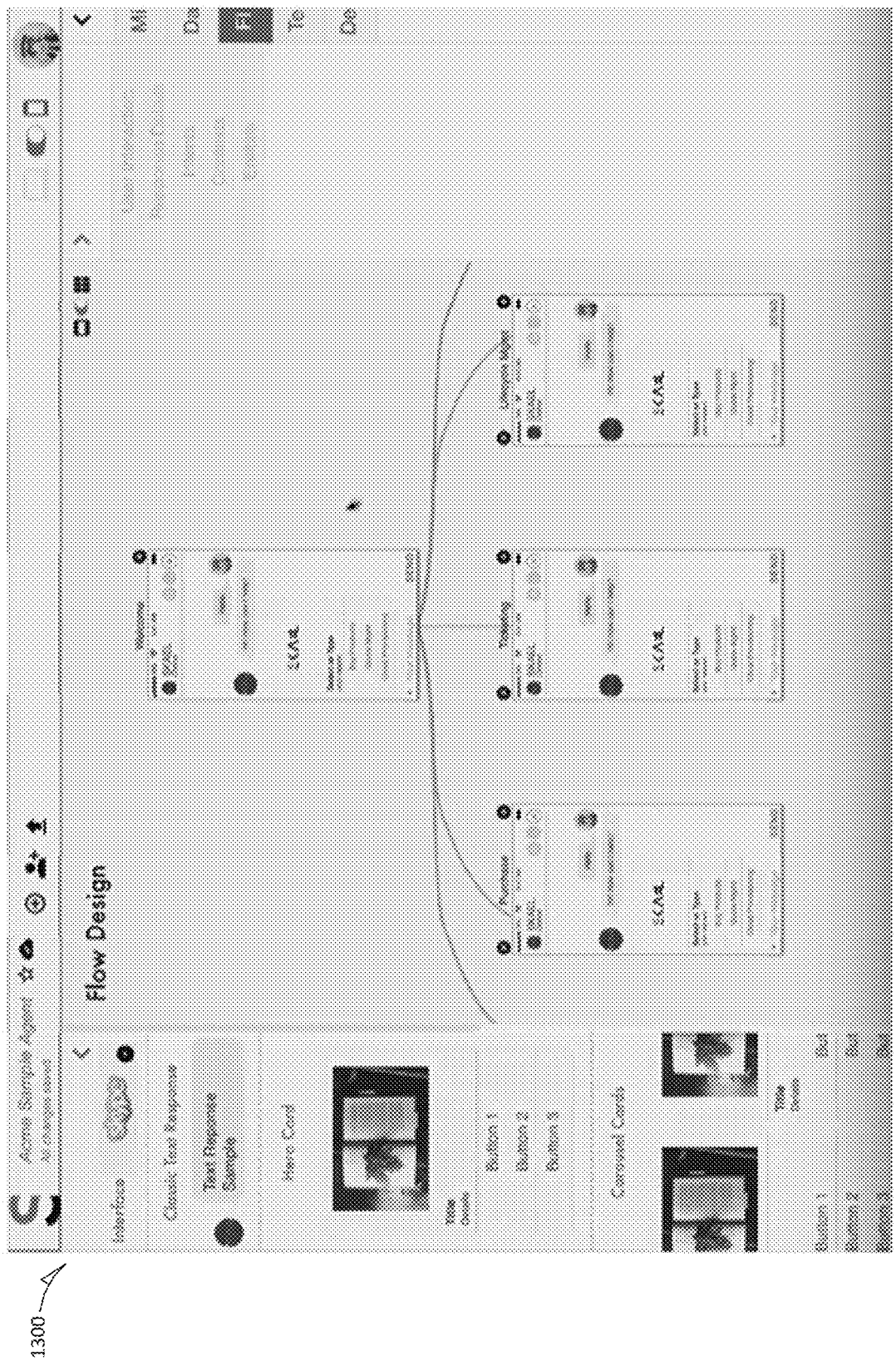
FIG. 13 is an example user interface for modifying user interface elements associated with each node in the workflow.

FIG. 13 is an example user interface 1300 for modifying user interface elements associated with each node in the workflow. In example embodiments, tools for editing the user interface elements are accessible via selection of a "Flow Design" menu item. In example embodiments, a particular digital assistant platform for which the user interface elements are to be configured is selectable via an "Interface" user interface element. The selected user platform (e.g., "Skype") may also be shown. Depending on the selected platform, different user interface elements (e.g., "Hero Card" or "Carousel Card") may be provided to the user for adding to the user interface flow. These user interface elements may be placed in the flow design region and connected to one or more additional user interface elements that are associated with the one or more nodes of the workflow. As depicted, the nodes of FIG. 13, including the Welcome, Purchase, Testing, and Lifecycle Management nodes are each associated with an interactive card. Each card has one or more properties, including, for example, a classic text response, and image, one or more navigational buttons, a title, and other details (e.g., report data and so on) that may be communicated to a user of the digital assistant upon accessing of the card. Each user interface element corresponding to the workflow nodes may be rearranged (e.g., through dragging and dropping) within the flow design region of the user interface. Furthermore, depending on the view size, only a portion of the flow design may be visible in the Flow Design region, but scrollable so that other portions can be viewed.

Figure 14:
FIG. 14 is an example user interface for editing a particular user interface element included in the workflow.

FIG. 14 is an example user interface 1400 for editing a particular user interface element included in the workflow. In example embodiments, the particular user interface element may be selected by the user for closer examination (e.g., zoomed in upon). In this case, the particular selected user interface element is the card of FIG. 13 that is associated with the "Purchase" node of FIG. 12. Zooming on a particular element such as this may allow the user to more easily see and/or edit attributes of the card, including text (e.g., the prompt associated with the card), machine-learned functions (or groups of functions) of back-end systems that are surfaced by the card (e.g., "Buy Products," "Quote Management," "Cloud Provisioning") to assist a user in accessing those functions in accordance with the machine-learned workflow, machine-learned data items that are relevant to the card, including images and associated titles and machine-learned actions associated with the data items (see, e.g., FIG. 7). In example embodiments, selecting a particular user interface element within the flow design for editing provides menu options for integrating the user interface element with the particular front-end system and/or digital assistant (e.g., Skype) for which the user interface element is to be provided, including "User Interaction," "Response Details," "Intents," "Contexts," and "Entities" that are to be associated with the user interface elements. As depicted, the "Response Details" menu option has been selected, which allows the user to specify various front-end integration data items corresponding to responses, including for example, response card quantity, response data, including image details, button details, title details, and so on.

Figure 15:
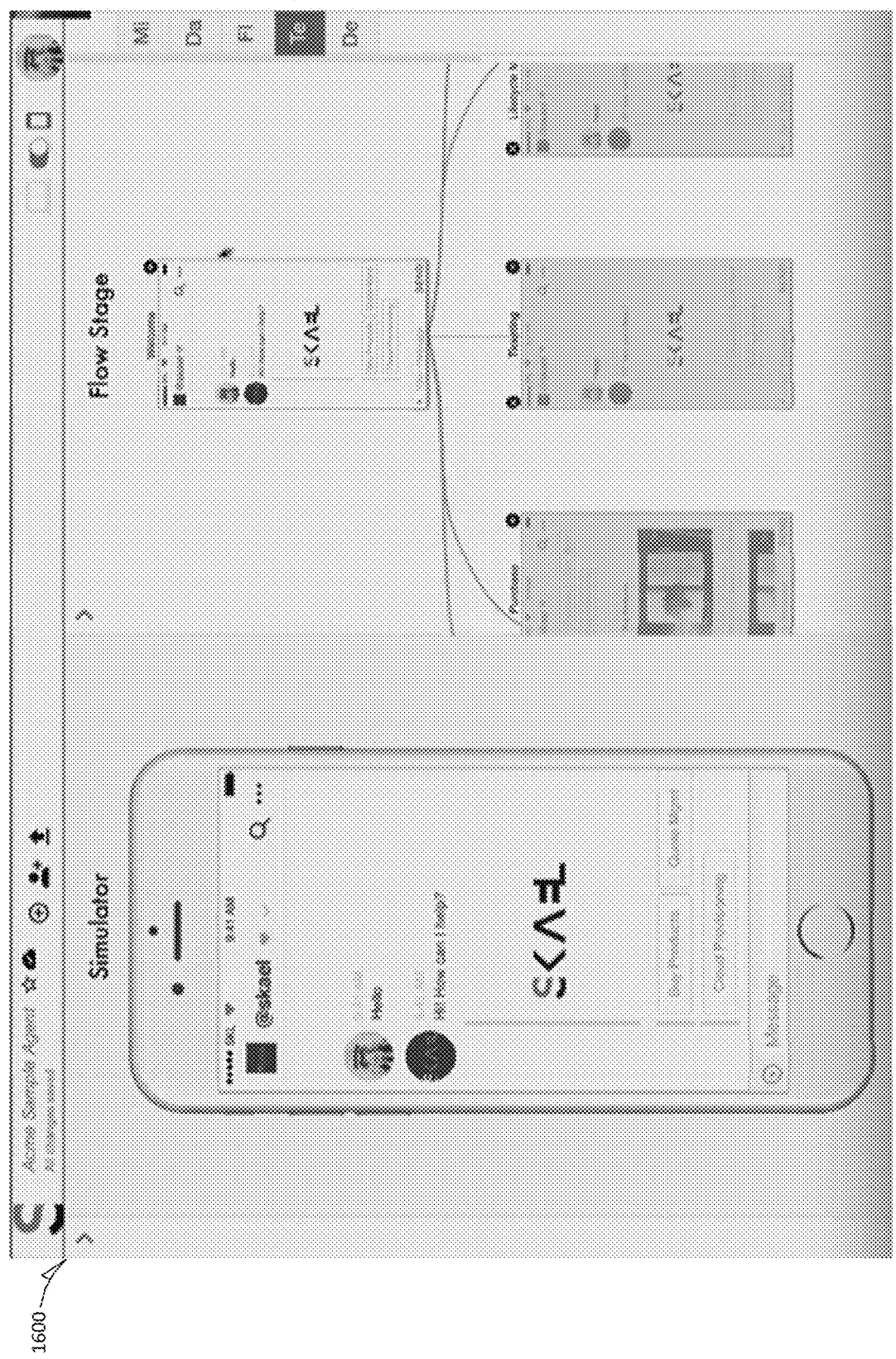
FIG. 15 is an example user interface for testing a workflow design.

FIG. 15 is an example user interface 1500 for testing a workflow design. As depicted, a "Simulator" is presented in a first region of the user interface. The simulator corresponds to a front-end system on which the flow design is to be. In this case, the front-end system includes a chatbot executing on a mobile phone via the selected platform (e.g., Skype, Slack, etc.). The simulator includes interactive user interface elements to allow the user to interact with the simulator just as the user would interact with the actual front-end system on which the flow design is deployed. A second (e.g., "Flow Stage") region of the user interface shows the location within the workflow that corresponds to the currently selected user interface element depicted in the simulator. Thus, the user can view the connections between the various nodes while the user interacts with the simulator. The user will then be able to replay the interaction to assess correct capture of user interaction and direction to the appropriate flow stage. If inaccurate, the user can unselect the chosen path in the flow stage and select the right path that should have captured the user's interaction, thus helping train the machine-learning algorithm.

After completing user acceptance testing and simulation, the user will have the option to select "Deploy" to have their digital assistant saved, packaged and deployed to their chosen interaction method (e.g., Skype, Slack, Microsoft Teams, Alexa, Google Assistant, etc.), which initiates a re-testing of all back-end connectivity, integrity of data sources and user flows for accuracy once more before releasing the custom machine-learning digital assistant onto their organization's selected interface.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a computer processor that is specially configured (e.g., using software), the computer processor may be specially configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 16:
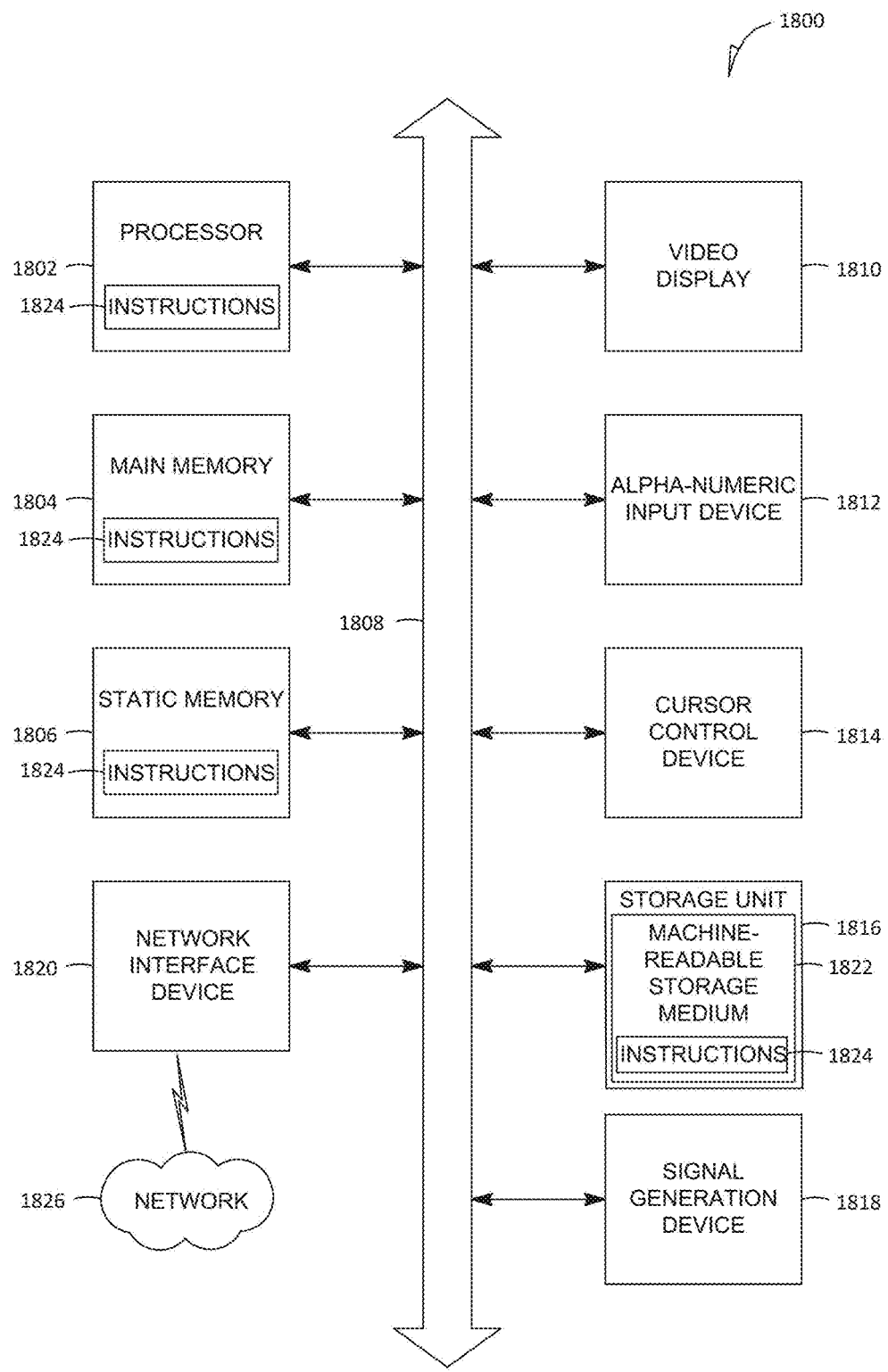
FIG. 16 is a block diagram of machine in the example form of a computer system within which instructions for causing the machine to perform any one or more of the methodologies discussed herein may be executed.

FIG. 16 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks: magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more computer processors;
one or more computer memories;
one or more usability modules incorporated into the one or more computer memories, the one or more usability modules configuring the one or more computer processors to perform operations for improving response times associated with responding to requests submitted at one or more front-end systems, the operations comprising:
listening for an utterance at an intelligent virtual assistant included in the one or more front-end systems, the utterance including a voice utterance or a chat utterance;
inferring an intent, a context, and a classification from the utterance based on a vocabulary that is specific to an organizational environment in which the one or more front-end systems and the one or more back-end systems have been deployed;
generating a request for a task to be performed at a node in a machine-learned bi-directional workflow data structure, the generating of the request based on the inferring of the intent, the context, and the classification;
generating a plurality of back-end system commands for performing the task based on machine-learned pathways in the bi-directional workflow data structure between the node and the back-end systems, the machine-learned pathways identified based on an application of a first machine-learned algorithm and an application of a second machine-learned algorithm, the first machine-learned algorithm identifying a first set of the pathways in the bi-directional workflow data structure going from the node into the one or more back-end systems, the second machine-learned algorithm identifying pathways in the bi-directional workflow data structure going from the one or more back-end systems to the node;
distributing the one or more back-end system commands across the one or more back-end systems using the machine-learned pathways;
receiving, using the machine-learned pathways, one or more results corresponding to execution of the plurality of back-end system commands by the one or more back-end systems; and
generating a response to the utterance for presentation via the intelligent virtual assistant, the response including an aggregation of the one or more results and a next predicted task, the next predicted task identified based on a correspondence between the utterance and an additional node in the bi-directional workflow data structure.

2. The system of claim 1, wherein the vocabulary that is specific to the organizational environment is determined through machine-learning, the machine learning including user acceptance testing of a training data set that includes mappings between past utterances received in the environment and past distributions of back-end system commands in the environment.

3. The system of claim 2, wherein the training data set includes feature vectors specifying intents, contexts, or classifications corresponding to the past utterances.

4. The system of claim 1, wherein the vocabulary is an insight that is derived from a comparison of the organizational environment to other organizational environments having an attribute in common with the organizational environment, the attribute pertaining to at least one of an industry type associated with the organizational environment or a size of the organizational environment.

5. The system of claim 1, wherein the one or more back-end systems include a private data source and a public data source, the private data source being private to the organizational environment, the private data source being correlated with the public data source based on HTML-based patterns reflecting structures of the private data source and the public data source.

6. The system of claim 1, further comprising formatting the response based on machine-learned rules associated with the organizational environment, the machine-learned rules specifying a graphical layout for the response based on the intent, the context, and the classification.

7. The system of claim 1, further comprising:
deriving insights pertaining to the organizational environment, the insights identifying a subset of the machine-learned organizational that are specific to one or more attributes of the organizational environment; and
storing the insights in a cloud-based database for anonymized access by one or more additional instances of the one or more usability modules deployed in one or more additional organizational environments.

8. A method comprising:
listening for an utterance at an intelligent virtual assistant included in one or more front-end systems, the utterance including a voice utterance or a chat utterance;
inferring an intent, a context, and a classification from the utterance based on a vocabulary that is specific to an organizational environment in which the one or more front-end systems and the one or more back-end systems have been deployed;
generating a request for a task to be performed at a node in a machine-learned bi-directional workflow data structure, the generating of the request based on the inferring of the intent, the context, and the classification;
generating a plurality of back-end system commands for performing the task based on machine-learned pathways in the bi-directional workflow data structure between the node and the back-end systems, the machine-learned pathways identified based on an application of a first machine-learned algorithm and an application of a second machine-learned algorithm, the first machine-learned algorithm identifying a first set of the pathways in the bi-directional workflow data structure going from the node into the one or more back-end systems, the second machine-learned algorithm identifying pathways in the bi-directional workflow data structure going from the one or more back-end systems to the node;
distributing the one or more back-end system commands across the one or more back-end systems using the machine-learned pathways;
receiving, using the machine-learned pathways, one or more results corresponding to execution of the plurality of back-end system commands by the one or more back-end systems; and
generating a response to the utterance for presentation via the intelligent virtual assistant, the response including an aggregation of the one or more results and a next predicted task, the next predicted task identified based on a correspondence between the utterance and an additional node in the bi-directional workflow data structure.

9. The method of claim 8, wherein the vocabulary that is specific to the organizational environment is determined through machine-learning, the machine learning including user acceptance testing of a training data set that includes mappings between past utterances received in the environment and past distributions of back-end system commands in the environment.

10. The method of claim 9, wherein the training data set includes feature vectors specifying intents, contexts, or classifications corresponding to the past utterances.

11. The method of claim 8, wherein the vocabulary is an insight that is derived from a comparison of the organizational environment to other organizational environments having an attribute in common with the organizational environment, the attribute pertaining to at least one of an industry type associated with the organizational environment or a size of the organizational environment.

12. The method of claim 8, wherein the one or more back-end systems include a private data source and a public data source, the private data source being private to the organizational environment, the private data source being correlated with the public data source based on HTML-based patterns reflecting structures of the private data source and the public data source.

13. The method of claim 8, further comprising formatting the response based on machine-learned rules associated with the organizational environment, the machine-learned rules specifying a graphical layout for the response based on the intent, the context, and the classification.

14. The method of claim 8, further comprising:
deriving insights pertaining to the organizational environment, the insights identifying a subset of the machine-learned organizational that are specific to one or more attributes of the organizational environment; and
storing the insights in a cloud-based database for anonymized access by one or more additional instances of the one or more usability modules deployed in one or more additional organizational environments.

15. A non-transitory computer-readable storage medium storing instructions thereon, which, when executed by one or more processors, cause one or more processors to perform operations, the operations comprising:
listening for an utterance at an intelligent virtual assistant included in the one or more front-end systems, the utterance including a voice utterance or a chat utterance;
inferring an intent, a context, and a classification from the utterance based on a vocabulary that is specific to an organizational environment in which the one or more front-end systems and the one or more back-end systems have been deployed;
generating a request for a task to be performed at a node in a machine-learned bi-directional workflow data structure, the generating of the request based on the inferring of the intent, the context, and the classification;
generating a plurality of back-end system commands for performing the task based on machine-learned pathways in the bi-directional workflow data structure between the node and the back-end systems, the machine-learned pathways identified based on an application of a first machine-learned algorithm and an application of a second machine-learned algorithm, the first machine-learned algorithm identifying a first set of the pathways in the bi-directional workflow data structure going from the node into the one or more back-end systems, the second machine-learned algorithm identifying pathways in the bi-directional workflow data structure going from the one or more back-end systems to the node;

distributing the one or more back-end system commands across the one or more back-end systems using the machine-learned pathways;

receiving, using the machine-learned pathways, one or more results corresponding to execution of the plurality of back-end system commands by the one or more back-end systems; and generating a response to the utterance for presentation via the intelligent virtual assistant, the response including an aggregation of the one or more results and a next predicted task, the next predicted task identified based on a correspondence between the utterance and an additional node in the bi-directional workflow data structure.

16. The non-transitory computer-readable storage medium of claim 15, wherein the vocabulary that is specific to the organizational environment is determined through machine-learning, the machine learning including user acceptance testing of a training data set that includes mappings between past utterances received in the environment and past distributions of back-end system commands in the environment.

17. The non-transitory computer-readable storage medium of claim 16, wherein the training data set includes feature vectors specifying intents, contexts, or classifications corresponding to the past utterances.

18. The non-transitory computer-readable storage medium of claim 15, wherein the vocabulary is an insight that is derived from a comparison of the organizational environment to other organizational environments having an attribute in common with the organizational environment, the attribute pertaining to at least one of an industry type associated with the organizational environment or a size of the organizational environment.

19. The non-transitory computer-readable storage medium of claim 15, wherein the one or more back-end systems include a private data source and a public data source, the private data source being private to the organizational environment, the private data source being correlated with the public data source based on HTML-based patterns reflecting structures of the private data source and the public data source.

20. The non-transitory computer-readable storage medium of claim 15, further comprising formatting the response based on machine-learned rules associated with the organizational environment, the machine-learned rules specifying a graphical layout for the response based on the intent, the context, and the classification.

* * * * *